United States Patent
Harl et al.

(10) Patent No.: US 7,131,289 B2
(45) Date of Patent: Nov. 7, 2006

(54) CONTAINER

(75) Inventors: Kara Lenee Harl, La Grange Park, IL (US); Anand Ramanujam, Arlington Heights, IL (US); Timothy E. Kozikoski, Chicago, IL (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 10/881,998

(22) Filed: Jun. 29, 2004

(65) Prior Publication Data

US 2005/0284171 A1    Dec. 29, 2005

(51) Int. Cl.
*F25D 3/08* (2006.01)
(52) U.S. Cl. ............ 62/457.2; 62/371; 62/457.6; 62/530
(58) Field of Classification Search ............ 62/371, 62/457.2, 457.6, 530
See application file for complete search history.

(56) References Cited

U.S. PATENT DOCUMENTS

| | | | |
|---|---|---|---|
| 3,172,769 A | 3/1965 | Horan | |
| 3,413,820 A | 12/1968 | Paquin | |
| 3,565,320 A | 2/1971 | Osborne | |
| 3,596,059 A | 7/1971 | Hager et al. | |
| 3,717,478 A | 2/1973 | Lipfert | |
| 3,721,803 A | 3/1973 | DiStefano | |
| 3,745,290 A | 7/1973 | Harnden et al. | |
| 3,799,143 A | 3/1974 | Bridges | |
| 3,974,658 A | 8/1976 | Starrett | |
| 4,024,731 A | 5/1977 | Branscum | |
| 4,094,434 A | 6/1978 | Coiner | |
| 4,206,854 A | 6/1980 | Takami | |
| 4,210,248 A | 7/1980 | Engdahl | |
| 4,337,116 A | 6/1982 | Foster et al. | |
| 4,416,906 A | 11/1983 | Watkins | |
| 4,470,264 A | 9/1984 | Morris | |
| 4,499,998 A * | 2/1985 | Carlson | 206/541 |
| 4,738,113 A | 4/1988 | Rudick | |
| 4,773,389 A | 9/1988 | Hamasaki | |
| 4,819,793 A | 4/1989 | Willard et al. | |
| 4,825,757 A | 5/1989 | Stoner | |
| 4,969,668 A | 11/1990 | Sauer | |
| 4,974,419 A | 12/1990 | Sabin et al. | |
| 5,035,250 A | 7/1991 | Mazelie | |
| 5,055,312 A | 10/1991 | Hildebrand | |
| 5,181,394 A | 1/1993 | Schea et al. | |
| 5,266,763 A | 11/1993 | Colombo | |
| 5,300,748 A | 4/1994 | Colombo | |
| 5,307,647 A | 5/1994 | McClure | |

(Continued)

FOREIGN PATENT DOCUMENTS

WO    WO 00/12409    3/2000

(Continued)

*Primary Examiner*—Cheryl Tyler
*Assistant Examiner*—B. Clayton McCraw
(74) *Attorney, Agent, or Firm*—Thomas C. Feix

(57) ABSTRACT

A container is disclosed which can include a container base having a cavity therein, a thermal source disposable in the cavity of the base, an insert being insertable within the cavity of the base such that the insert is in close proximity to the thermal source, and a cover. The cover and the insert can define a sealable compartment for the storage of food items. In other embodiments, the cover can be engageable directly with the base to define a storage compartment. The thermal source can act as either or both a heater and a cooler to help maintain the food items stored in the container at a desired temperature.

37 Claims, 39 Drawing Sheets

U.S. PATENT DOCUMENTS

| | | | |
|---|---|---|---|
| 5,390,797 A | 2/1995 | Smalley et al. | |
| 5,440,975 A | 8/1995 | Bean et al. | |
| 5,495,727 A | 3/1996 | Strong et al. | |
| 5,533,361 A | 7/1996 | Halpern | |
| 5,552,075 A | 9/1996 | Salyer | |
| 5,568,735 A * | 10/1996 | Newkirk et al. | 62/457.7 |
| 5,570,588 A * | 11/1996 | Lowe | 62/457.7 |
| 5,701,757 A * | 12/1997 | Heverly | 62/457.2 |
| 5,704,485 A * | 1/1998 | Cautereels et al. | 206/546 |
| 5,773,106 A | 6/1998 | deGroot et al. | |
| 6,044,650 A * | 4/2000 | Cook et al. | 62/130 |
| 6,151,910 A | 11/2000 | Hazen | |
| 6,170,696 B1 * | 1/2001 | Tucker et al. | 220/793 |
| 6,527,121 B1 | 3/2003 | Flynn | |
| 6,564,558 B1 | 5/2003 | Seymour | |
| 2002/0054943 A1 | 5/2002 | Flynn | |
| 2003/0054943 A1 | 6/2003 | Lemer | |
| 2003/0101743 A1 * | 6/2003 | Defelice et al. | 62/457.2 |
| 2003/0150238 A1 | 8/2003 | Dais et al. | |
| 2004/0011795 A1 | 1/2004 | Porchia et al. | |
| 2004/0045314 A1 * | 3/2004 | Roth et al. | 62/457.2 |

FOREIGN PATENT DOCUMENTS

| | | |
|---|---|---|
| WO | WO 00/18225 | 4/2000 |
| WO | WO 03/069242 | 8/2003 |
| WO | WO 03/104731 | 12/2003 |

* cited by examiner

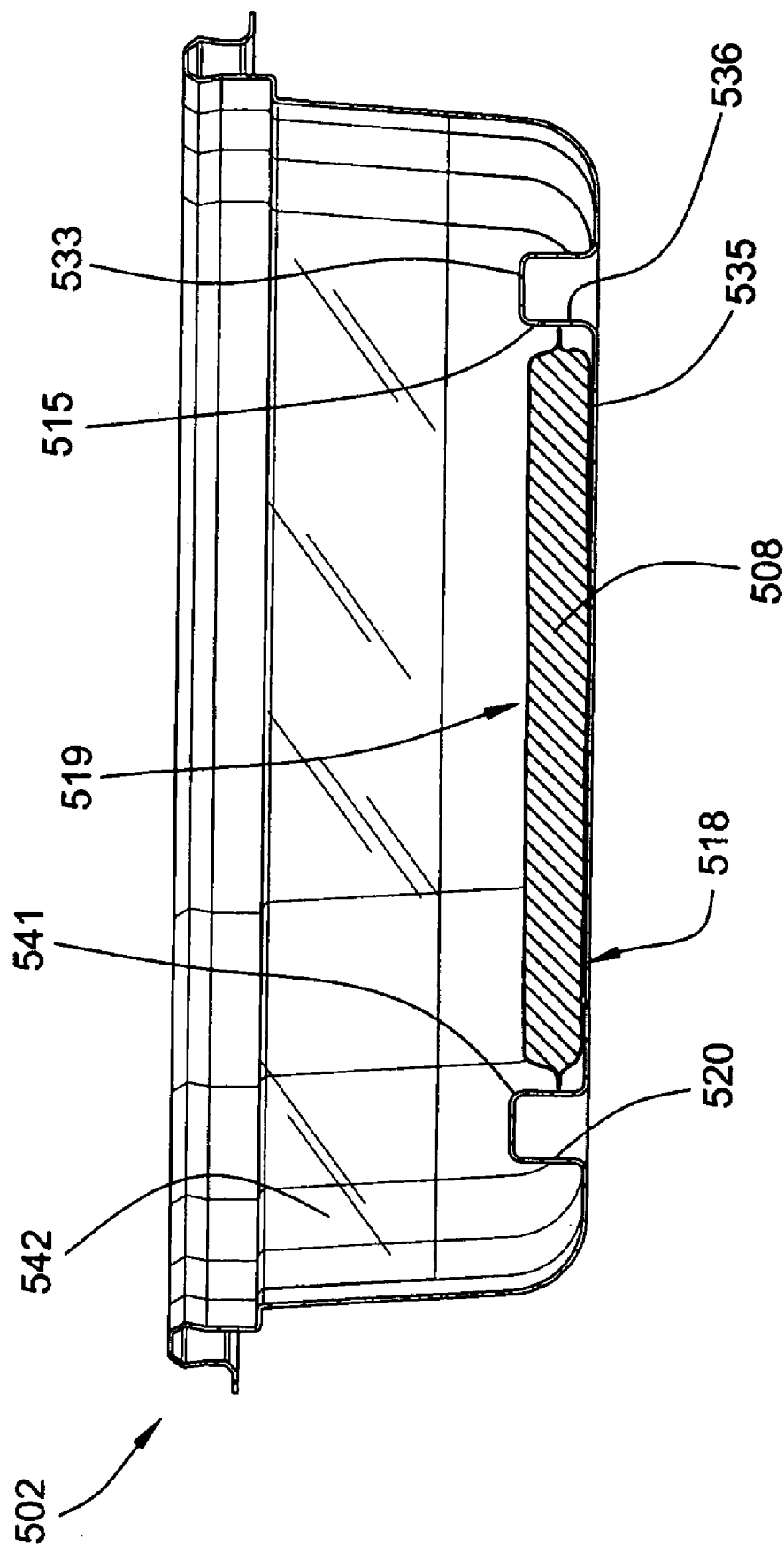

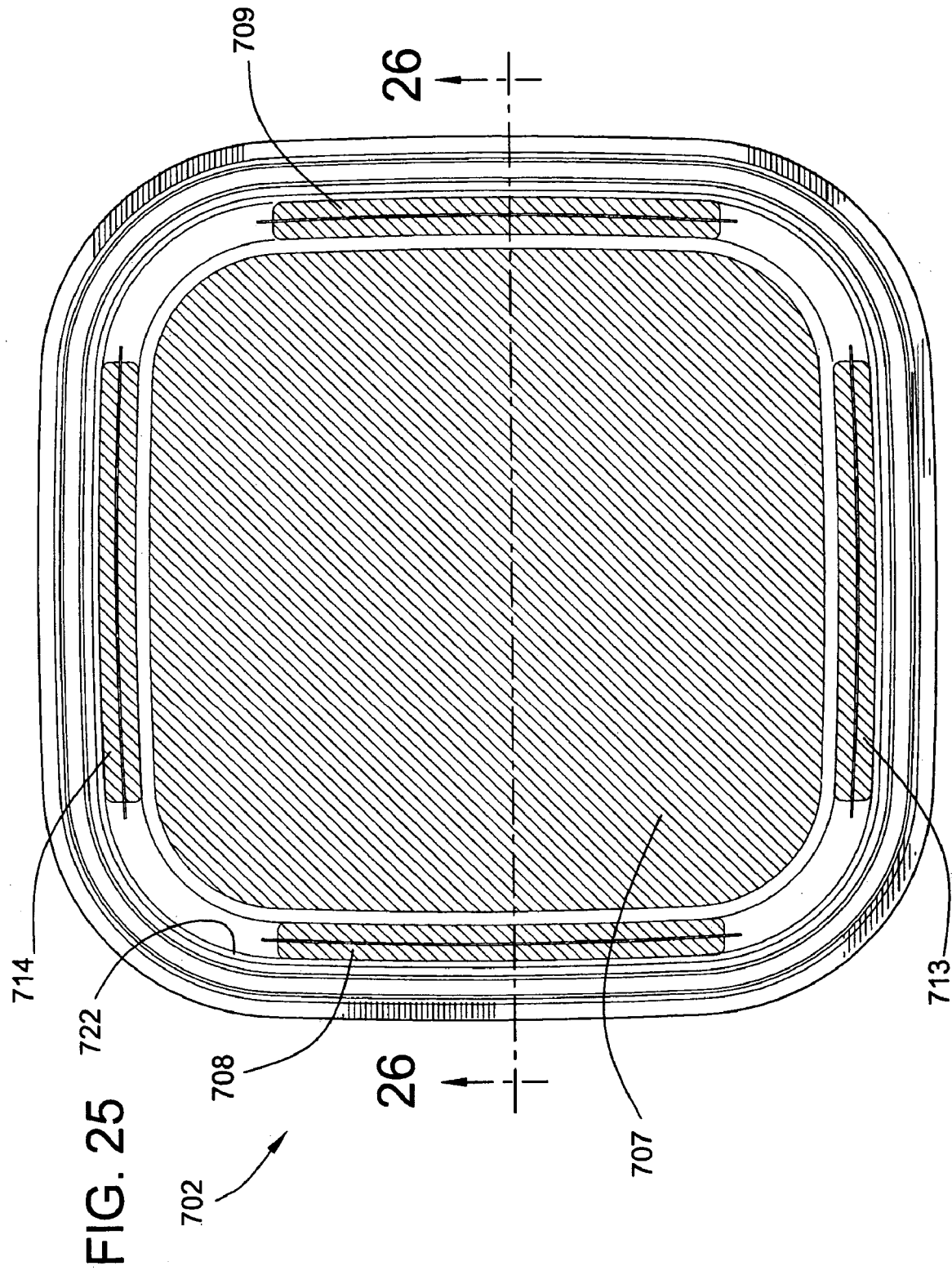

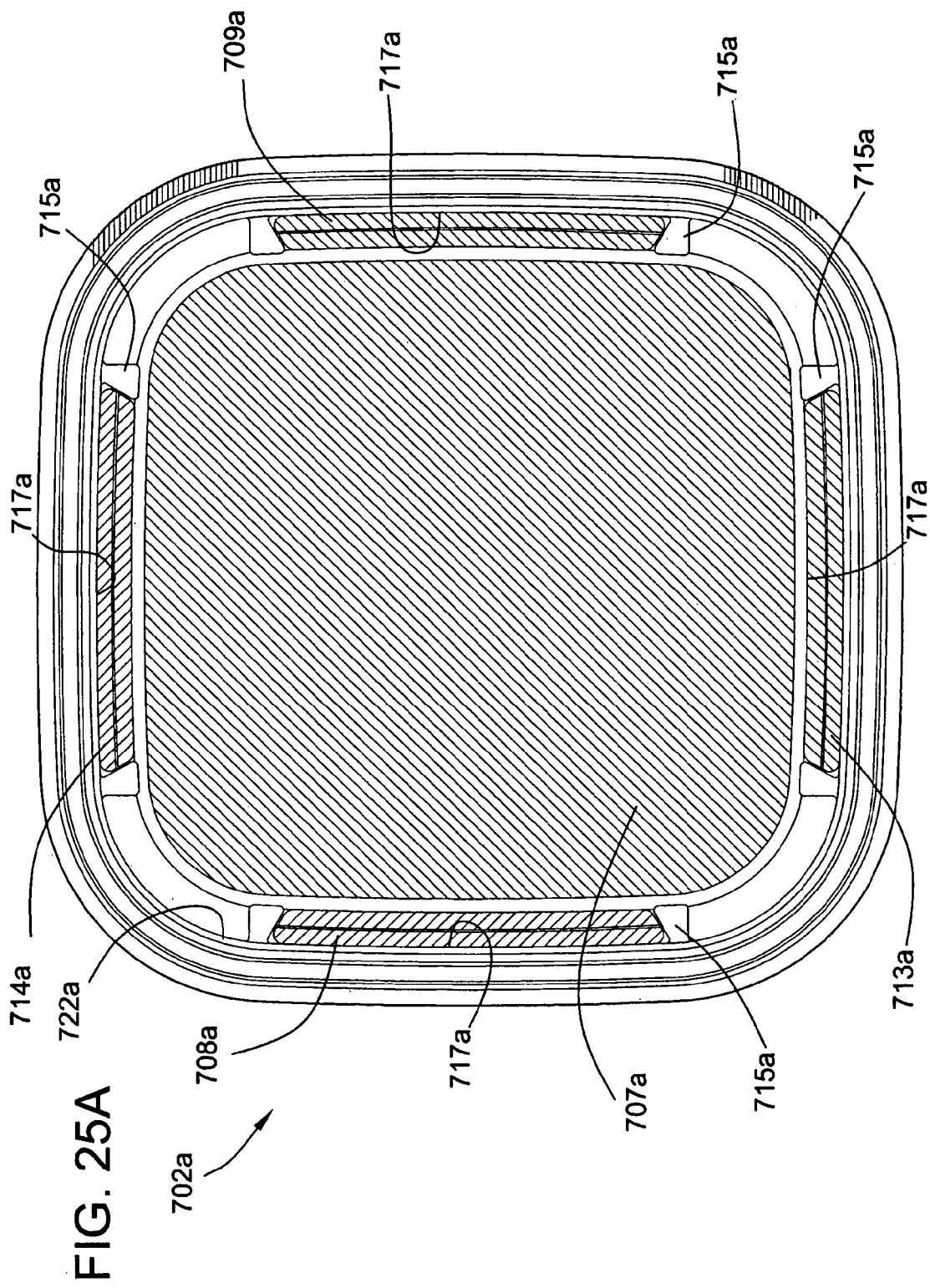

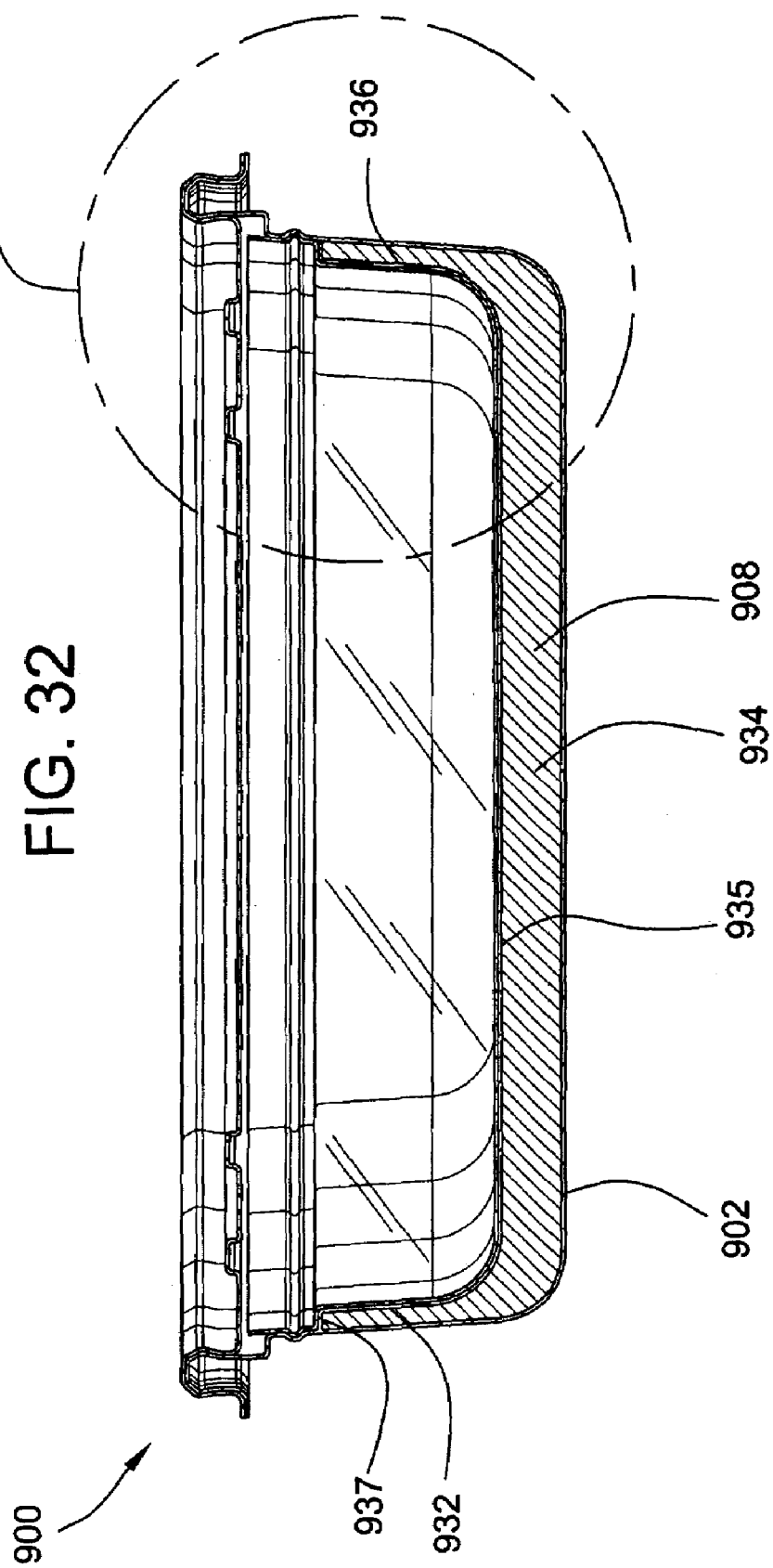

CONTAINER

FIELD OF THE INVENTION

The present invention relates generally to containers and, more particularly, to containers having thermal sources for storing items under heating conditions and/or cooling conditions.

BACKGROUND OF THE INVENTION

Rigid thermoplastic food containers are generally known. Typically, such a container can be used to store food in a refrigerator for subsequent use at which time the container may be placed in a microwave for heating the food stored in the container. Also, such containers can be used to transport food items from one location to another, such as, in the case where a consumer takes his or her lunch to work. In such a situation where the container is used to transport food items, it is often desirable to subject the food stored in the container to a temperature different than the ambient temperature while the container is in transport. The desired temperature may be either lower or higher than ambient temperature. Further, the user of the container can in some situations remove the food stored in the container at a location where it is inconvenient for the user to clean the container of any residual food left in the container. Many users would find it desirable to have a container which offers relatively simple clean up after using it to store food items. The prior art has provided solutions for subjecting items stored in a container to either elevated or lowered temperatures via a thermal source. The present invention has as a general aim to provide such a container.

SUMMARY OF THE INVENTION

The invention provides a container that can be readily manufactured, for example, with conventional thermoforming equipment. In one embodiment, the container can include a container base having a first closure portion, a thermal source disposable in the base, an insert having a second closure portion, the insert being insertable within the base such that the insert is in close proximity to the thermal source, the second closure portion sealingly engageable with the first closure portion, and a cover having a third closure portion, the third closure portion sealingly engageable with the second closure portion. The insert can be disposed within the base with the second closure portion sealingly engaged to the first closure portion such that items, such as food, can be stored within the insert. When the second and third closure portions are occluded, the insert and the cover define a substantially sealed storage area. Each closure portion includes at least one sealing surface. The closure portions of the container can be engaged with each other to provide a substantially leak-proof, re-sealable closure. The thermal source can provide thermal energy to act as a heater, a cooler, or both. The thermal source can include any suitable media for producing the desired temperature effect.

The closure portions can be configured to permit the venting of the container during occlusion of the insert to the base and the cover to the insert and during microwave re-heating of food, for example. Since the insert and cover are not hermetically sealed, the pressure build up during heating or freezing can be allowed to vent to the atmosphere. After the contents of the container have been used, the insert can be removed from the base and thrown away or washed for repeated use. The insert and the cover can be economically constructed from relatively thin-gauge plastic such that the user can either wash them after use or dispose of them with the view that their purchase price allows them to be used as a consumable good.

The present invention provides a reusable, tight sealing container. The cover can be made from a semi-transparent material to ensure satisfactory visibility of the container contents. The container can be suitable for refrigerator, freezer, microwave and machine dishwasher use.

The features of the present invention will become apparent to one of ordinary skill in the art upon reading the detailed description, in conjunction with the accompanying drawings, provided herein.

BRIEF DESCRIPTION OF THE DRAWINGS

FIG. 22 is a cross-sectional view taken along line 22—22 in FIG. 21.

FIG. 25 is a top plan view of another embodiment of a base and a plurality of media packets for use in a container according to the present invention.

FIG. 25A is a top plan view of another embodiment of a base and a plurality of media packets for use in a container according to the present invention.

FIG. 32 is a cross-sectional view taken along the line 32—32 in FIG. 31.

DETAILED DESCRIPTION OF EMBODIMENTS OF THE INVENTION

Figure 1:
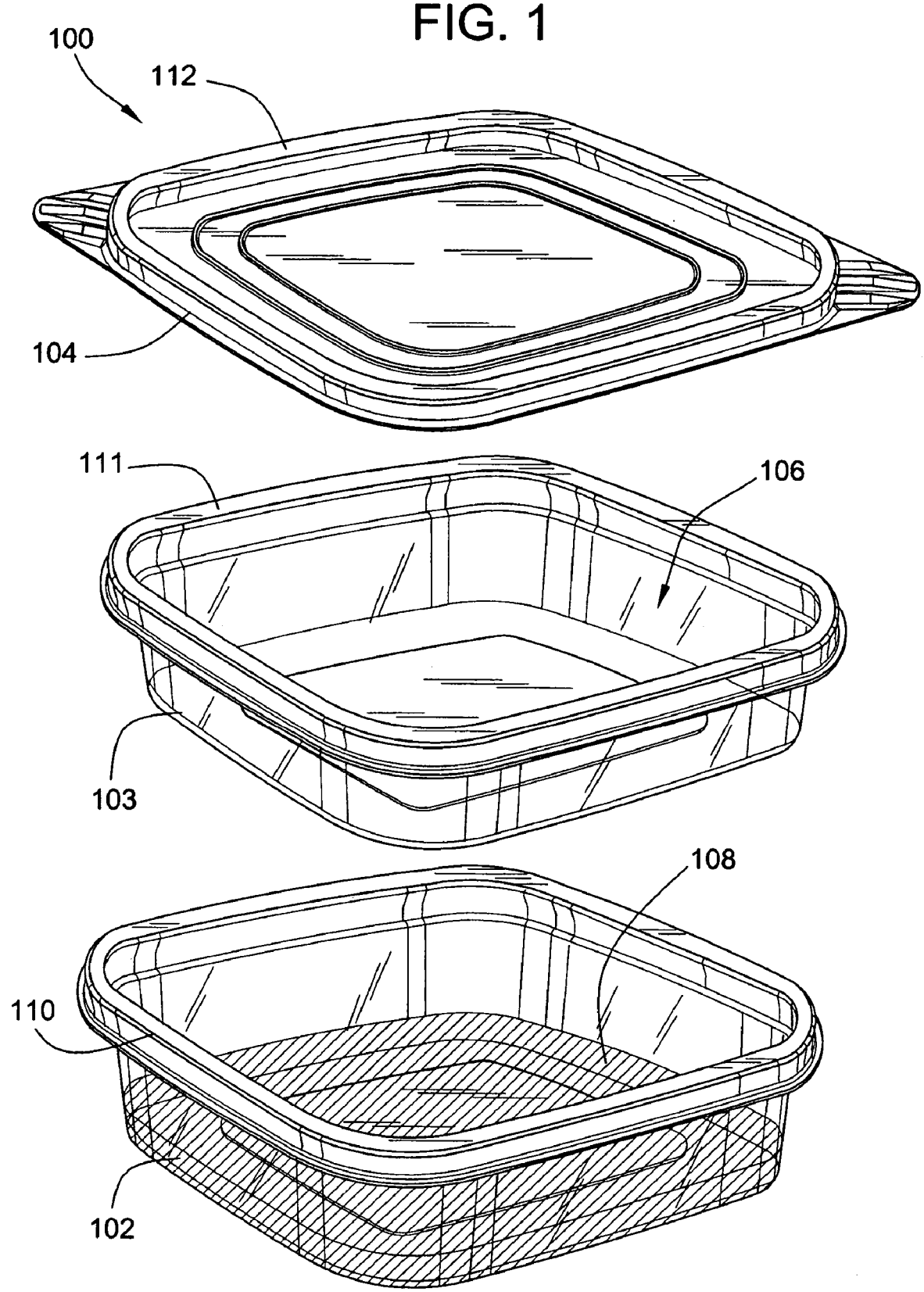
FIG. 1 is an exploded view of a container according to an embodiment of the present invention.
Figure 2:
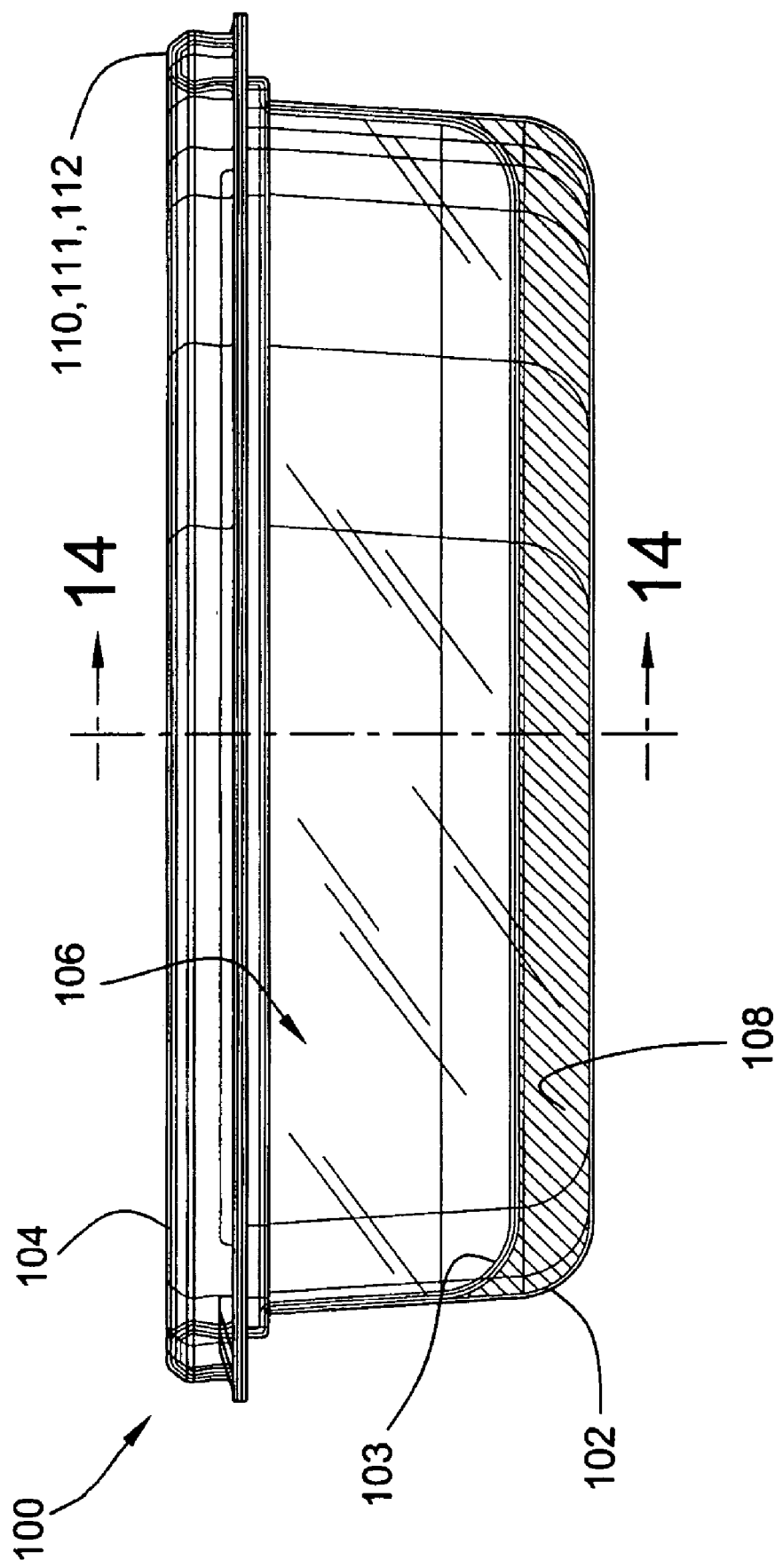
FIG. 2 is a side elevational view of the container of FIG. 1.

In accordance with the teachings of the present invention and with reference to FIGS. 1 and 2, there is provided an embodiment of a container 100. In this embodiment, the container 100 includes a base 102, a removable insert 103, and a flexible cover 104. The base 102 can receive the insert 103 therein. The cover 104 can sealingly close the insert to define a storage area 106 therein. The container can be reusable. The insert 103 and the cover 104 can be constructed such that they can be reusable but able to be sold at a price point where a consumer can view them as disposable items, with replacement inserts and covers available for retail sale.

For providing a thermal source, the base 102 can house a thermal energy-generating device 108 in the form of a predetermined amount of thermal media, for example. Embodiments of the thermal device can provide thermal energy for providing a cooling effect, a heating effect, or both.

The base 102 includes a first closure portion 110 in the form of a raised locking ring. The insert 103 includes a second closure portion 111 in the form of a raised locking ring. The cover 104 includes a third closure portion 112 in the form of a raised locking ring. The closure portions 110, 111, 112 can be engaged with each other to provide a leak-resistant, re-sealable closure to occlude the base 102, the insert 103, and the cover 104. The closure portions 110, 111, 112 can be occluded to seal the container 100 by pinching the locking rings between a user's fingers, for example. The closure portions 110, 111, 112 can each be similar to those shown and described in U.S. Pat. No. 6,170,696 to Tucker et al. and U.S. patent application Ser. No. 10/387,237 to Tucker, which are incorporated herein in their entireties by this reference.

The container base 102, the container insert 103, and the container cover 104 can be made of a plastic material. The base, the insert, and the cover can be made by any suitable manufacturing technique, such as a thermoforming process, for example. The container can be made with conventional thermoforming equipment. The tools can be run on an in-line extrusion/forming process or on a roll-fed thermoforming process, for example.

Figure 3:
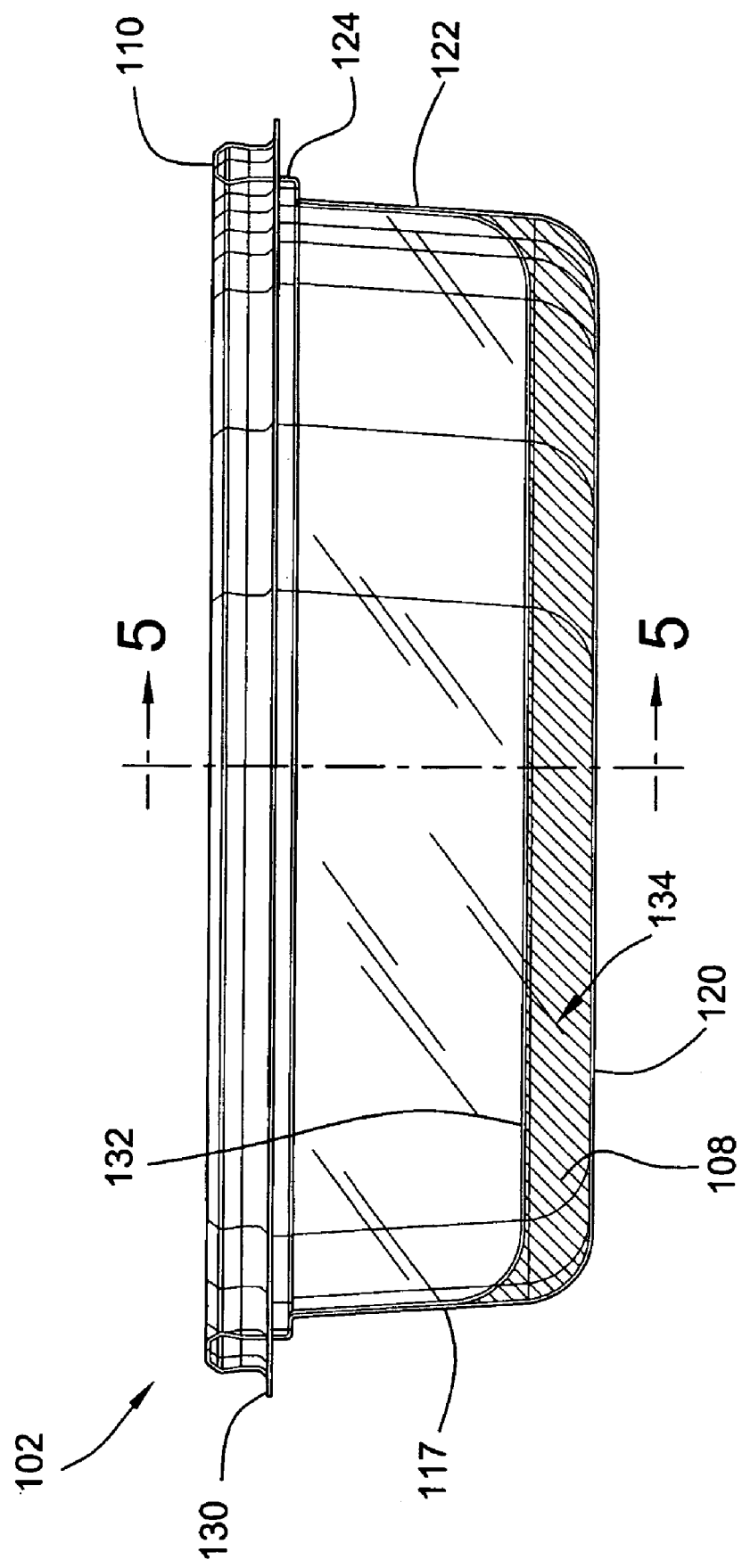
FIG. 3 is a side elevational view of a base of the container of FIG. 1.
Figure 4:
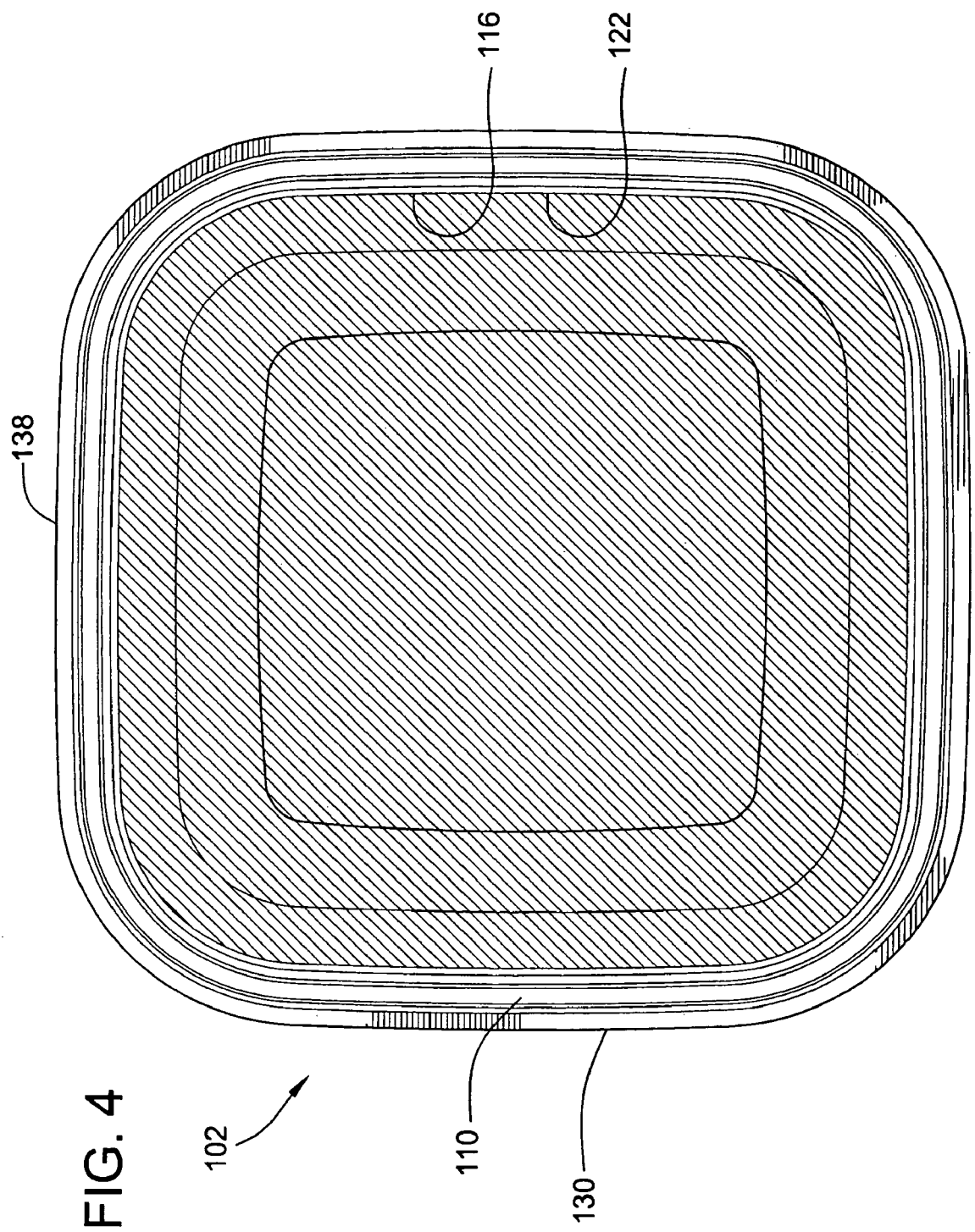
FIG. 4 is a top plan view of the base of FIG. 3.
Figure 5:
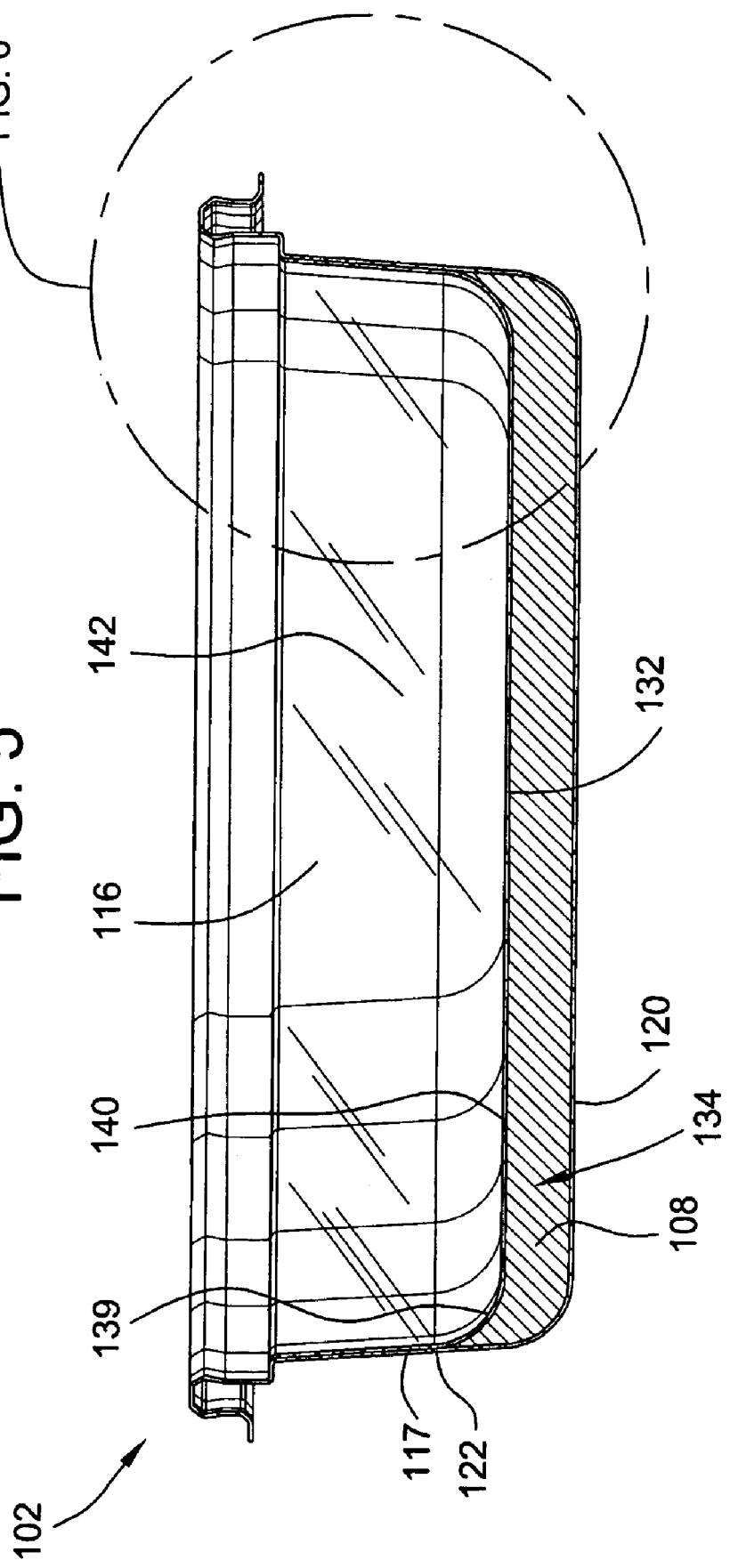
FIG. 5 is a cross-sectional view taken along line 5—5 in FIG. 3.

Referring to FIGS. 3–5, the base 102 is shown. The base 102 has an interior surface 116 and an exterior surface 117 and includes a generally planar bottom 120 and a sidewall 122 extending from the periphery of the bottom 120. Referring to FIG. 3, the first closure portion 110 is in the form of a raised locking ring that extends around an upper edge 124 of the sidewall 122. The base 102 includes a flange 130 which extends outwardly from the first closure portion 110, extending therearound, as shown in FIG. 4. The base 102 includes a partition 132 in spaced relationship with the bottom 120 to define a storage area 134 therebetween. The thermal media 108 can be disposed in the storage area 134. In the illustrated embodiment, the storage area 134 is substantially filled with the thermal media 108.

Referring to FIG. 4, the base 102 is defined by a perimeter 138 and is substantially square. In other embodiments, the base 120 can have other shapes, such as, rectangular, circular, or elliptical, for example. The flange 130 can provide a convenient gripping surface to facilitate the occlusion of the insert and the base or the cover and the base and the removal of the cover and/or the insert from the base. The bottom 120 can include an embossed area or receive a label, a sticker, or other display means for bearing indicia.

Referring to FIG. 5, the partition 132 has a curved periphery 139 which merges into the sidewall 122 and a central field portion 140 which is substantially planar. In other embodiments, the sidewall 122 may be curved and may have a constant wall draft or may include a combination of arcs and linear segments with or without points of inflection. The partition 132 and the sidewall 122 define an interior cavity 142. The interior cavity 142 can be configured to accommodate the insert.

The thermal device 108 is disposed in the storage area 134. In this embodiment, the thermal device 108 is in the form of a gel in an amount which substantially fills the storage area 134. The thermal device 108 can be used to provide a thermal source which generates thermal energy to act as a cooler or thermal energy to act as a heater, and in other embodiments, the thermal generator can selectively act as either a heater or a cooler. Examples of a thermal media suitable for use in a thermal generator for acting as a cooler include a refrigerant comprising a mixture of water and glycerin or water and polyacrylates, for instance. Examples of a thermal media suitable for use in a thermal generator for acting as a heater include a high molecular weight silicone and water mixture with a high heat capacity, carbon for facilitating the heating thereof, and silica gel, for instance. In yet other embodiments, the thermal media can include a microwave receptor material for facilitating the microwave heating of the thermal generator. In embodiments where the thermal generator can be used to selectively act as a cooler or a heater, suitable thermal media include a high molecular weight silicone and water mixture, for example.

In some embodiments, the thermal media can be a "unigel" comprising a mixture of about 98.2% water and 1.8–2.1% solids, wherein the solids can comprise 80–85% sodium carboxymethylcellulose, 10–16% sodium benzoate, and 4.6% cross linkers. In other embodiments, the thermal generator can comprise two or more chemicals which when mixed together create an exothermic reaction or an endothermic reaction, depending upon the type of thermal energy which is desired to be generated. The chemicals can be kept segregated by a known capsulation technique, for example, until it is desired to generate thermal energy.

Figure 6:
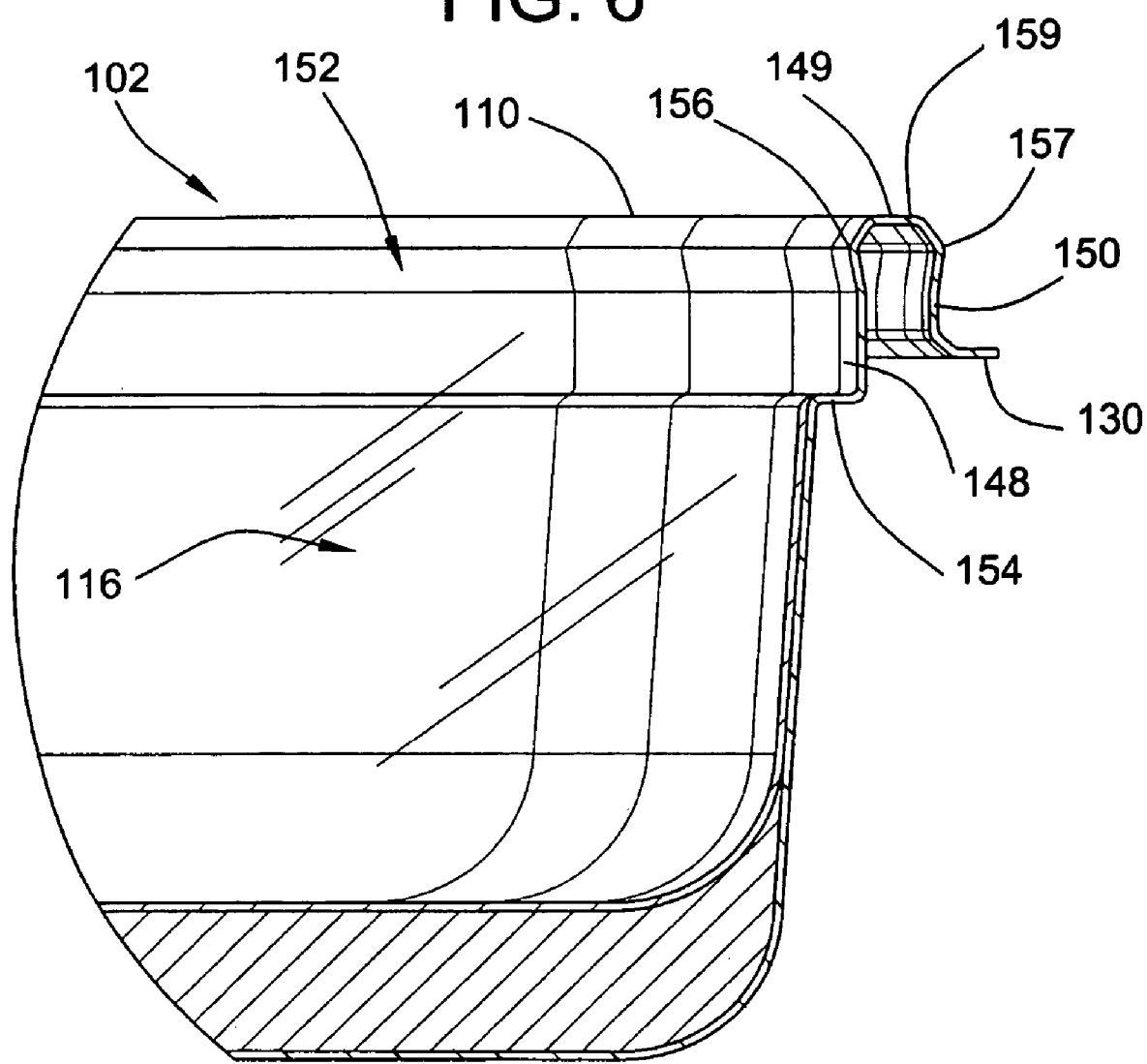
FIG. 6 is an enlarged, detail view of the area indicated in FIG. 5.

Referring to FIG. 6, the first closure portion 110 includes an inner wall 148, a retention bead 149, and an outer wall 150. The inner wall 148, the retention bead 149, and the outer wall 150 define a first sealing surface 152, which is part of the interior surface 116 of the base 102. The inner wall 148 extends between a step 154 and the retention bead 149. The retention bead 149 can include a pair of rounded shoulders 156, 157 and a crown surface 159. The outer wall 150 extends between the retention bead 149 and the flange 130. The inner and outer walls 148, 150 converge toward each other from the retention bead 149 toward the step 154 and the flange 130, respectively, and in doing so provide inside and outside cut back portions.

The base 102 has a sufficient thickness to withstand the heat of microwave cooking and remain sturdy during lifting while laden with hot food and also withstand the heat of top-shelf dishwashing without deforming. The base 102 can be constructed to withstand the temperatures of a freezer. The base can be made from any suitable plastic. In addition, the base can have layers of material and can be made by any suitable technique, such as coextrusion, lamination, or over molding, for example.

In one embodiment, the shell of the base 102, comprising the bottom 120 and the sidewall 122 along with the first closure portion 110, can be formed as an integral piece. The thermal generator 108 can be placed upon the bottom 120 in the interior of the shell. The partition 132 can be placed over the thermal generator 108 and secured to the sidewall 122 by any suitable technique, such as, heat sealing, adhesive, ultrasonic welding, or laser sealing, for example, to define the storage area 134 for the thermal generator 108.

In one embodiment, the container base 102 can be formed from polypropylene with a starting sheet thickness in the range of 15 to 120 mils and preferably 40 to 60 mils. In one embodiment, the container base is formed from a starting sheet thickness of about 54 mils. The wall thickness of the container base can vary due to the manufacturing process.

Figure 7:
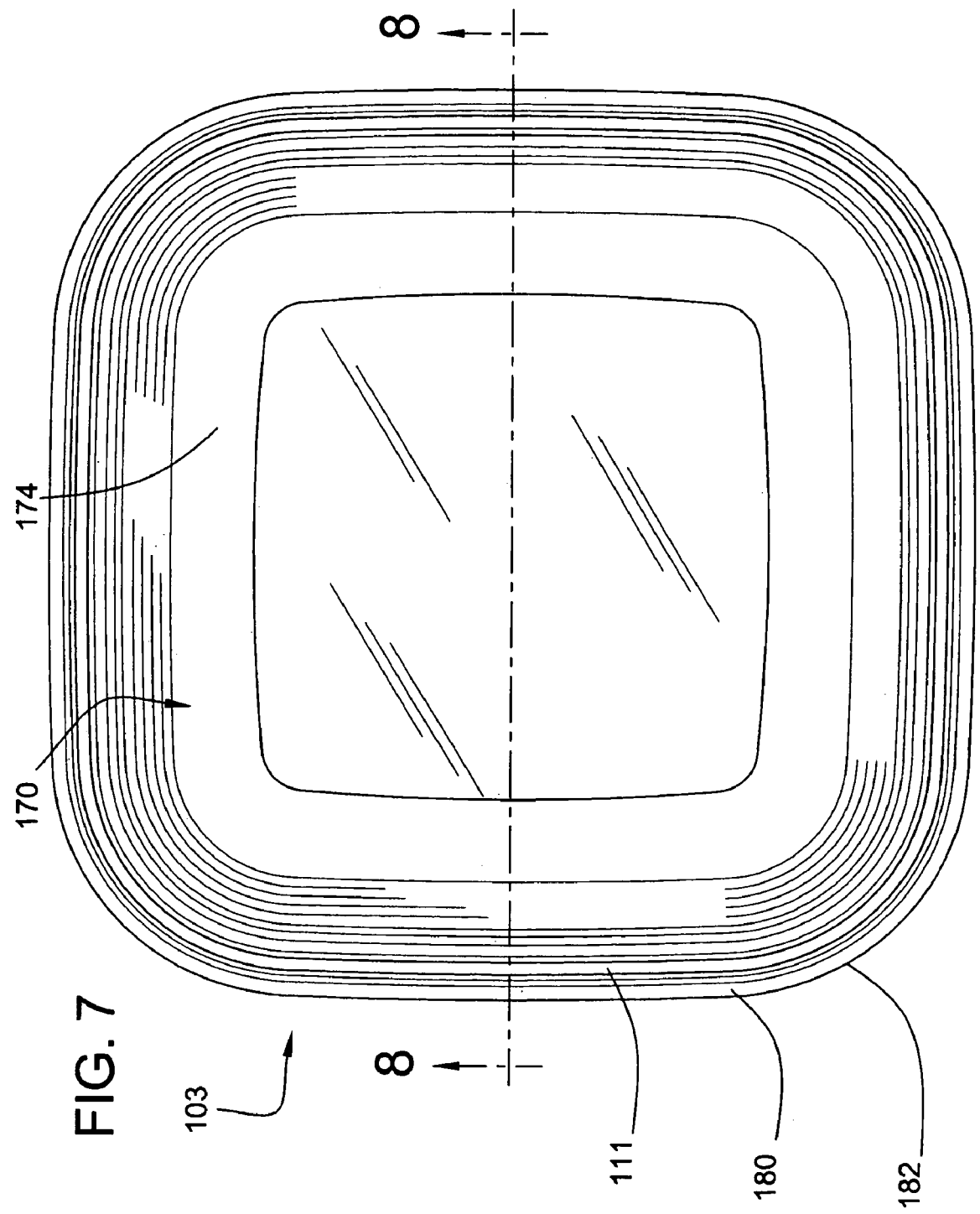
FIG. 7 is a top plan view of an insert of the container of FIG. 1.
Figure 8:
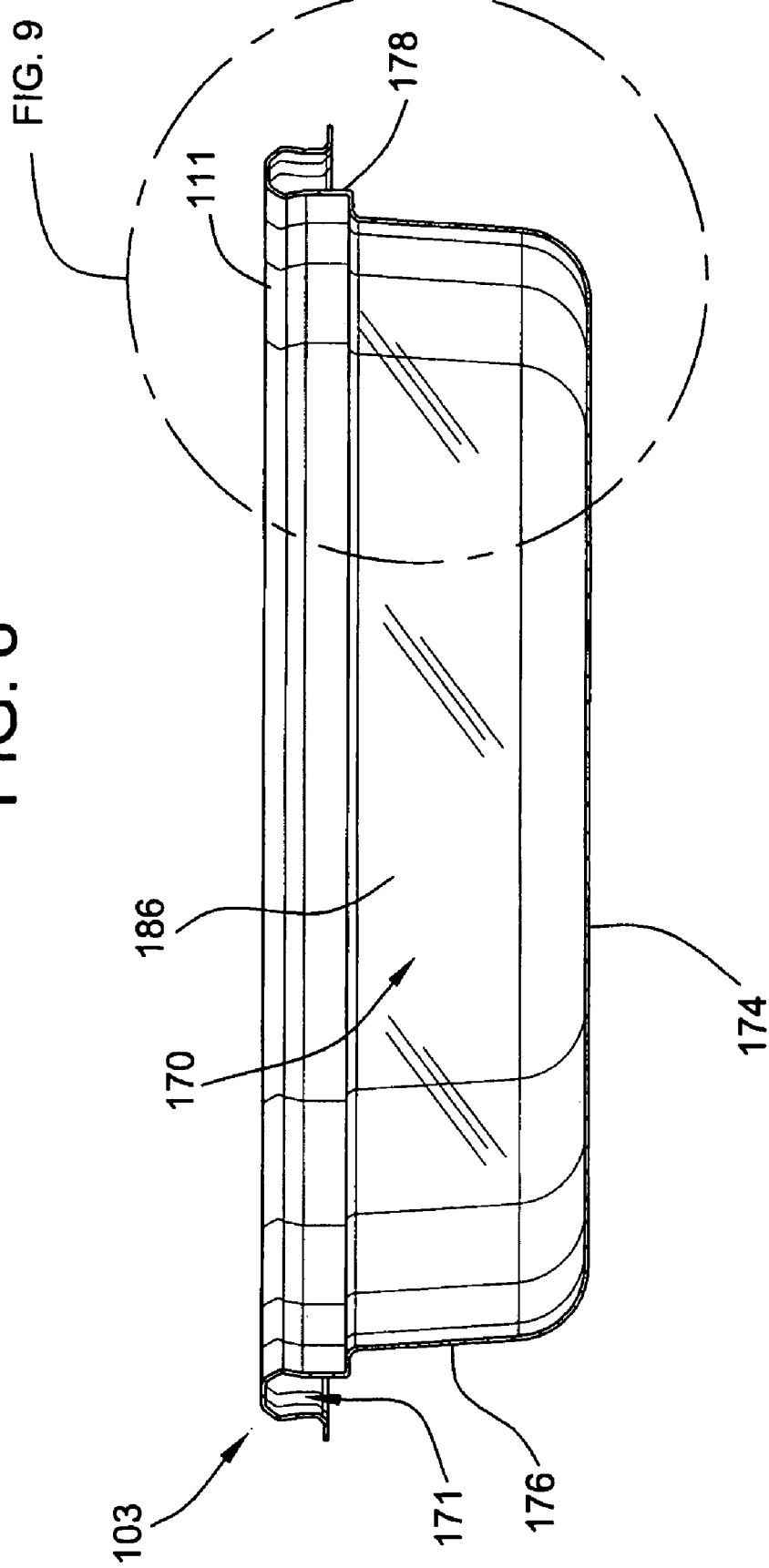
FIG. 8 is a cross-sectional view taken along line 8—8 in FIG. 7.

Referring to FIGS. 7 and 8, the insert 103 is shown. The insert 103 has an interior surface 170 and an exterior surface 171 and includes a generally planar bottom 174 and a sidewall 176 extending from the periphery of the bottom. The second closure portion 111 is in the form of a raised locking ring that extends around an upper edge 178 of the sidewall 176. Referring to FIG. 7, the insert 103 can include a flange 180 which extends outwardly from the second closure portion 111, extending therearound. A perimeter 182 of the insert 103 is substantially square and substantially corresponds to the shape of the base to allow for the insertion of the insert 103 into the interior cavity of the base.

Referring to FIG. 8, the bottom 174 and the sidewall 176 of the insert 103 define an interior storage compartment 186 for the storage of food items, for example. The insert 103 can be constructed such that it has a wall thickness which is smaller than the thickness of the base. The insert 103 can be made from any suitable plastic and can be made by any suitable technique, such as thermal forming. In one embodiment, the insert 103 can be formed from polypropylene with a starting sheet thickness in the range of 15 to 120 mils and preferably 25 to 35 mils. In one embodiment, the insert 103 can be formed from a starting sheet thickness of about 30 mils. The wall thickness of the insert can vary due to the thermal forming process.

Figure 9:
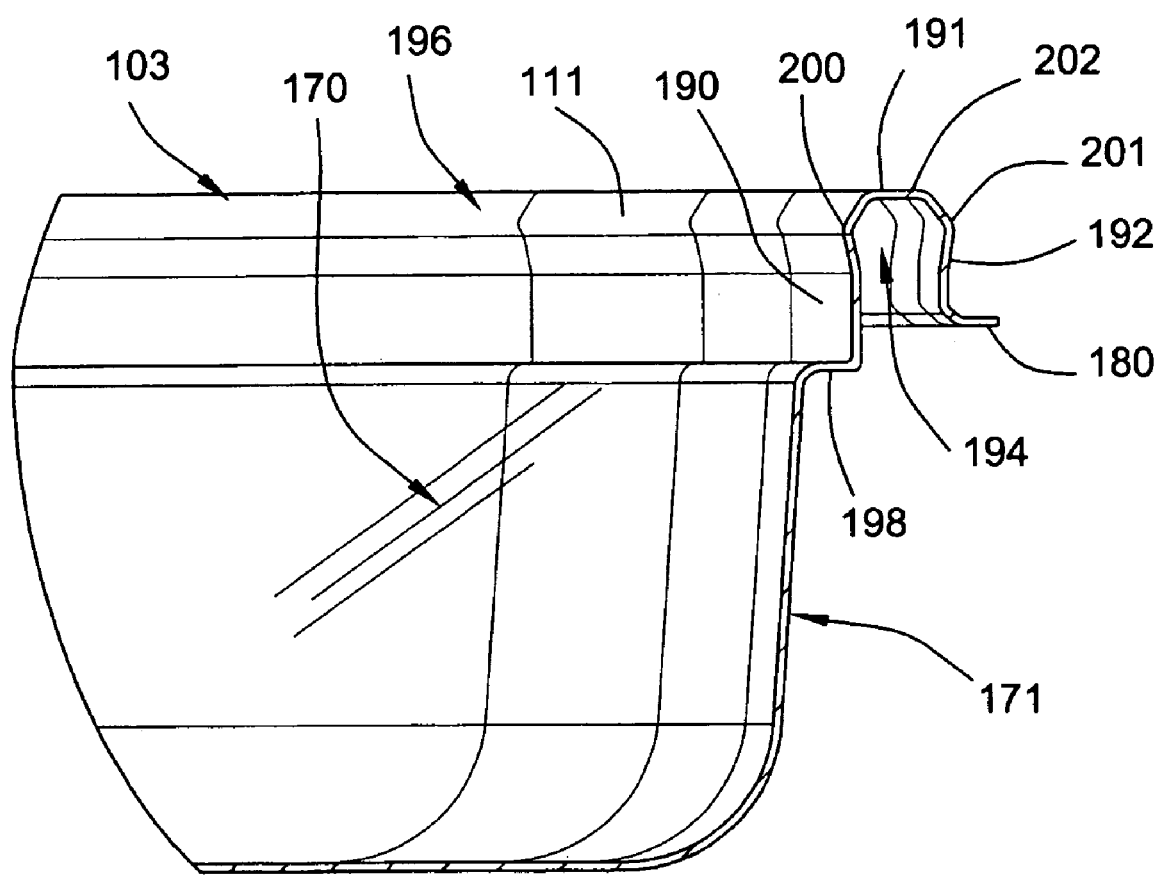
FIG. 9 is an enlarged, detail view of the area indicated in FIG. 8.

Referring to FIG. 9, the second closure portion 111 is similar to the first closure portion. The second closure portion 111 can be slightly smaller than the first closure portion such that an interference fit can be established therebetween. The second closure portion 111 can include an inner wall 190, a retention bead 191 and an outer wall 192. The inner wall 190, the retention bead 191, and the outer wall 192 can define a second sealing surface 194 which is a part of the exterior surface 171 of the insert 103 and a third sealing surface 196 which is a part of the interior surface 170 thereof. The inner wall 190 extends between a step 198 and the retention bead 192. The retention bead 191 can include a pair of shoulders 200, 201 and a crown surface 202. The outer wall 192 extends between the retention bead 191 and the flange 180. The inner and outer walls 190, 192 converge toward each other from the retention bead 191 toward the step 198 and the flange 180, respectively, and in doing so provide inside and outside cutback portions.

Figure 10:
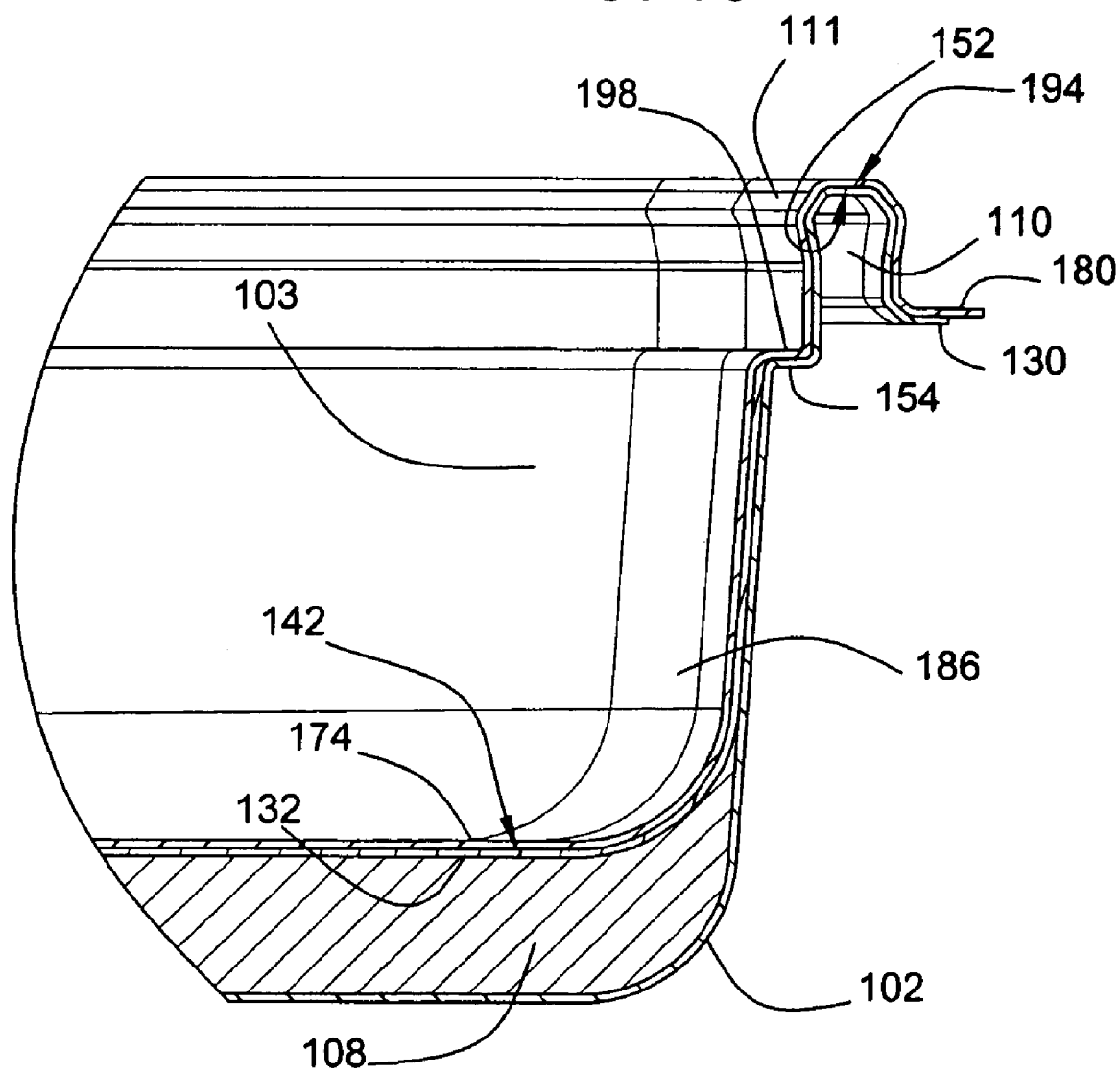
FIG. 10 is a view of the base and the insert similar to FIGS. 6 and 9, respectively, showing the insert sealingly engaged to the base.

Referring to FIG. 10, the insert 103 is shown disposed in the cavity 142 of the base 102. The step 198 of the insert can rest upon the step 154 of the base 102. The flange 180 of the insert 103 can extend outwardly beyond the flange 140 of the base 102 to facilitate the user's gripping of the insert flange 180 when removing the insert 103 from the base 102, for example. The bottom 174 of the insert 103 can be disposed in adjacent relationship to the partition 132 of the base 102. The thermal generator 108 is in close relationship to the insert 103 such that the thermal energy generated by the thermal media can be conducted toward the insert 103. Food items stored within the storage compartment 186 of the insert can be subjected to the thermal energy transmitted by the thermal generator to provide cooling and/or heating storage conditions.

The first and second closure portions 110, 111 can be configured to be slightly different in size to form an interference fit therebetween. The interference fit between the first and second closure portions 110, 111 can provide the sealing engagement between the closure portions to occlude the insert 103 and the base 102. As a result, when the two pieces are engaged, a positive seal can be formed between the first and second sealing surfaces 152, 194 around the perimeter of the base 102 and the insert 103. In one embodiment, the range of interference fit between the first and second closure portions 110, 111 is about 0.005 to about 0.020 inches.

At least one of the first and second closure portions 110, 111 can include at least one notch that defines an air passageway between the base 102 and the insert 103 when the closure portions 110, 111 of the base and the insert undergo an occlusion sequence. Examples of such a notch can be found in U.S. patent application Ser. No. 10/387,283 to Tucker.

Figure 11:
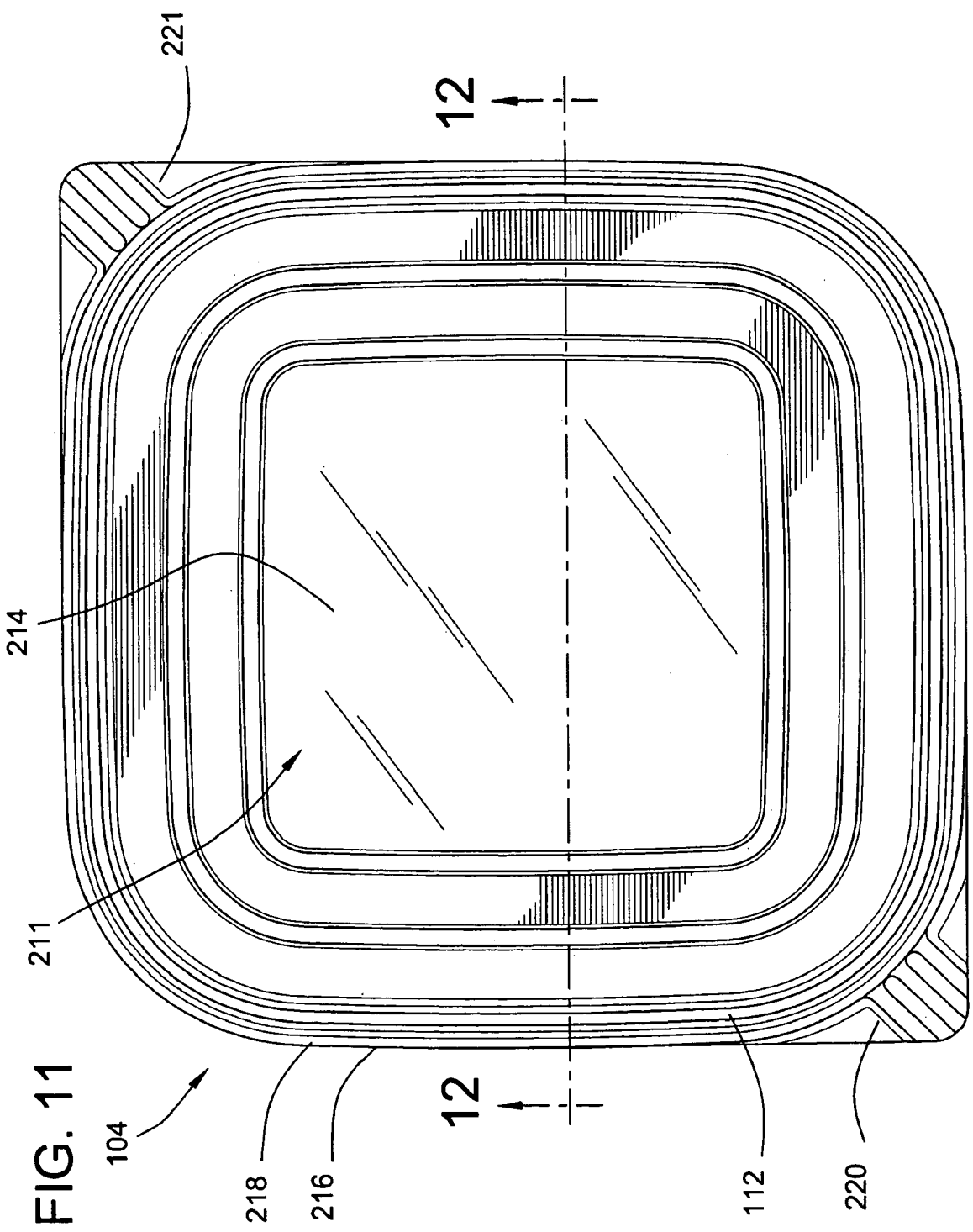
FIG. 11 is a top plan view of a cover of the container of FIG. 1.
Figure 12:
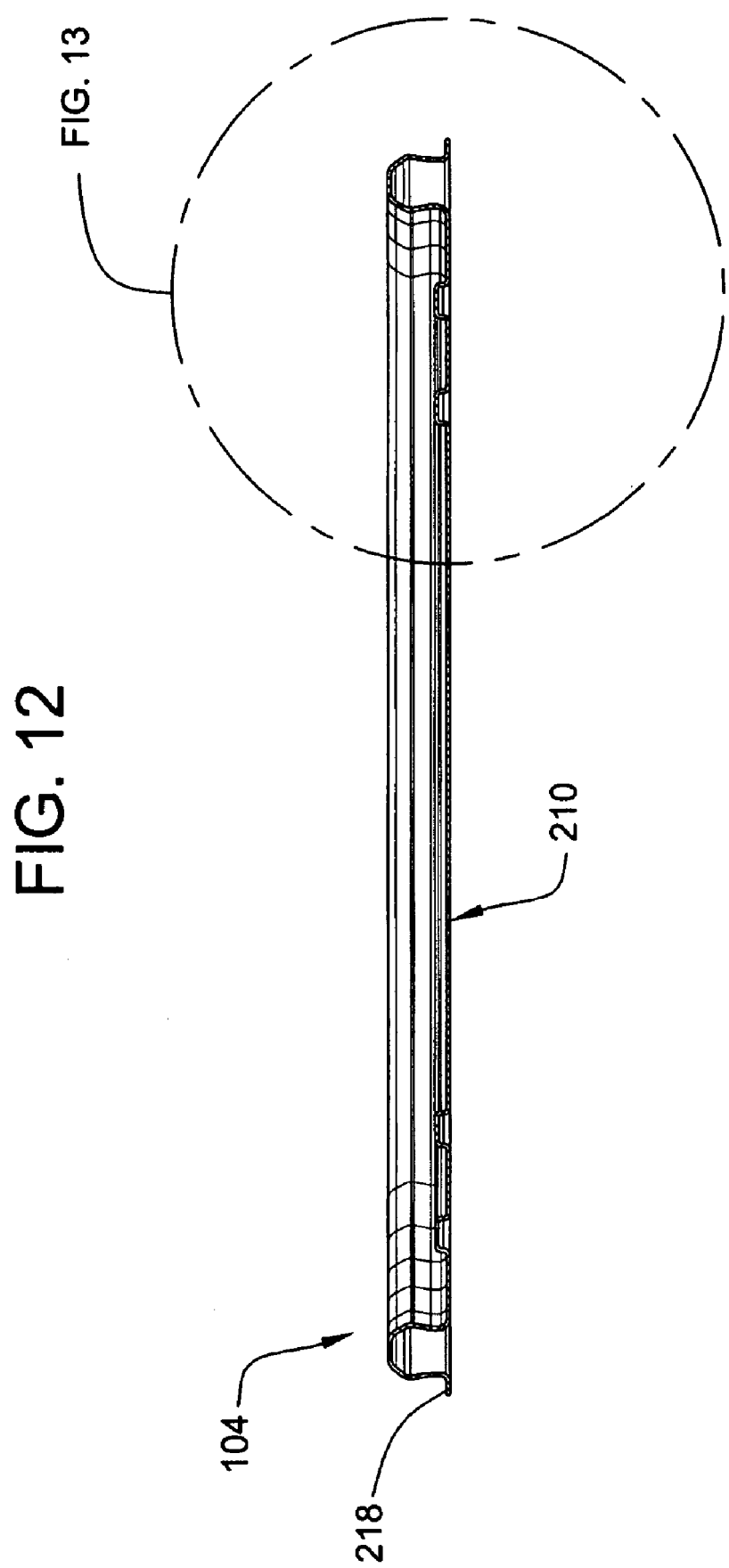
FIG. 12 is a cross-sectional view taken along line 12—12 in FIG. 11.

Referring to FIGS. 11 and 12, the cover 104 is shown. The cover 104 includes an interior surface 210 and an exterior surface 211. Referring to FIG. 11, the cover 104 includes a central field portion 214 that is generally square. In other embodiments, the field portion 214 can be other shapes, for example, rectangular, circular, or elliptical. The central field portion 214 is configured such that it can include an embossed area or receive a label, a sticker, or other display means for bearing indicia.

The third closure portion 112 can extend from the exterior surface 211, extending around a perimeter 216 of the cover 104. A generally planar flange 218, also shown in FIG. 12, can extend from the third closure portion 112. The cover 104 can include at least one gripping tab adjacent the third closure portion 112 to facilitate removal of the cover from the insert and the base. The cover 104 includes a pair of gripping tabs 220, 221. The gripping tabs 220, 221 are disposed in opposing relationship to each other, extending from the third closure portion 112 and the flange 218. The gripping tabs 220, 221 are integral with the flange 218 and extend outwardly therefrom. Each tab 112 can include a relieved portion adjacent the third closure portion 112. The relieved portion can provide less interference contact with the insert and/or the base during the removal or engagement of the cover 104 while still providing an adequate closure portion to maintain proper sealing of the closure device.

In other embodiments, the gripping tabs 220, 221 may have other shapes as seen from a top plan view. In other embodiments, the gripping tab may also include one or more cross-ribs or a textured surface to improve the grip on the tab.

Referring to FIG. 12, the cover 104 can be constructed such that it has a wall thickness which is smaller than the thickness of the base. The cover 104 can be made from any suitable plastic and can be made by any suitable technique, such as thermal forming. The cover 104 can be formed from polypropylene with a starting sheet thickness in the range of 7 to 60 mils and preferably 12-to 25 mils. In one embodiment, the cover 104 can be formed from polypropylene with a starting sheet thickness of about 20 mils. The wall thickness of the cover 104 can vary due to the thermal forming process.

The thinner container cover reduces material costs and increases flexibility to more easily accommodate its removal from, and engagement onto, the base. The cover 104 can maintain adequate flexibility for proper sealing even during typical freezer temperatures. Furthermore, the lack of surface detail on the container material provides for easy washing.

Figure 13:
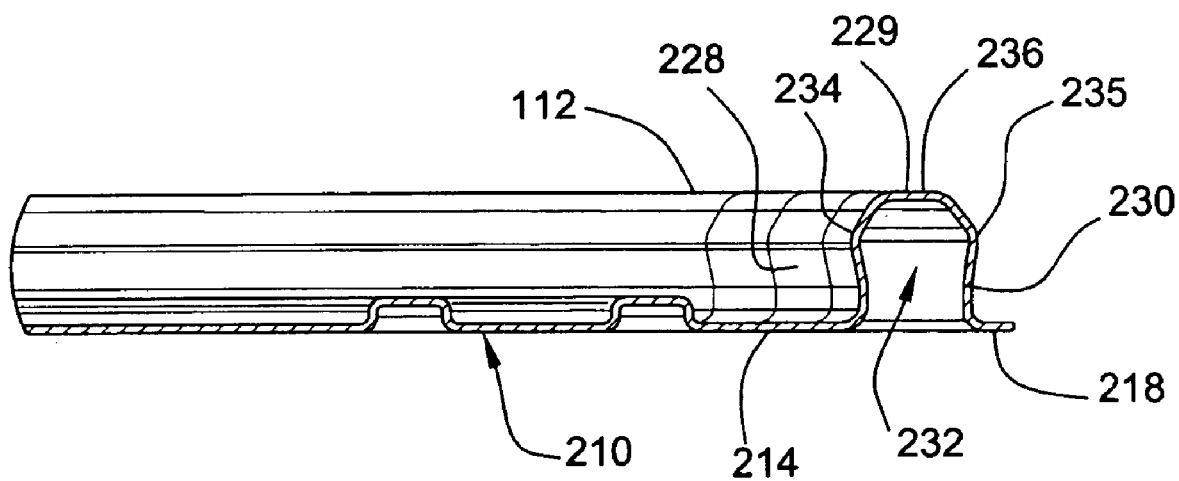
FIG. 13 is an enlarged, detail view of the area indicated in FIG. 12.

Referring to FIG. 13, the third closure portion 112 is similar to the first closure portion. The third closure portion 112 includes an inner wall 228, a retention bead 229, and an outer wall 230. The inner wall 228, the retention bead 229, and the outer wall 230 define a fourth sealing surface 232, which is a part of the interior surface 210 of the cover 104. The inner wall 228 extends between the field portion 214 and the retention bead 229. The retention bead 229 can include a pair of shoulders 234, 235 and a crown surface 236. The outer wall 230 joins the retention bead 229 and the flange 218. The inner and outer walls 228, 230 converge toward each other from the retention bead 229 toward the field portion 214 and the flange 218, respectively, and in doing so provide inside and outside cut back portions.

Figure 14:
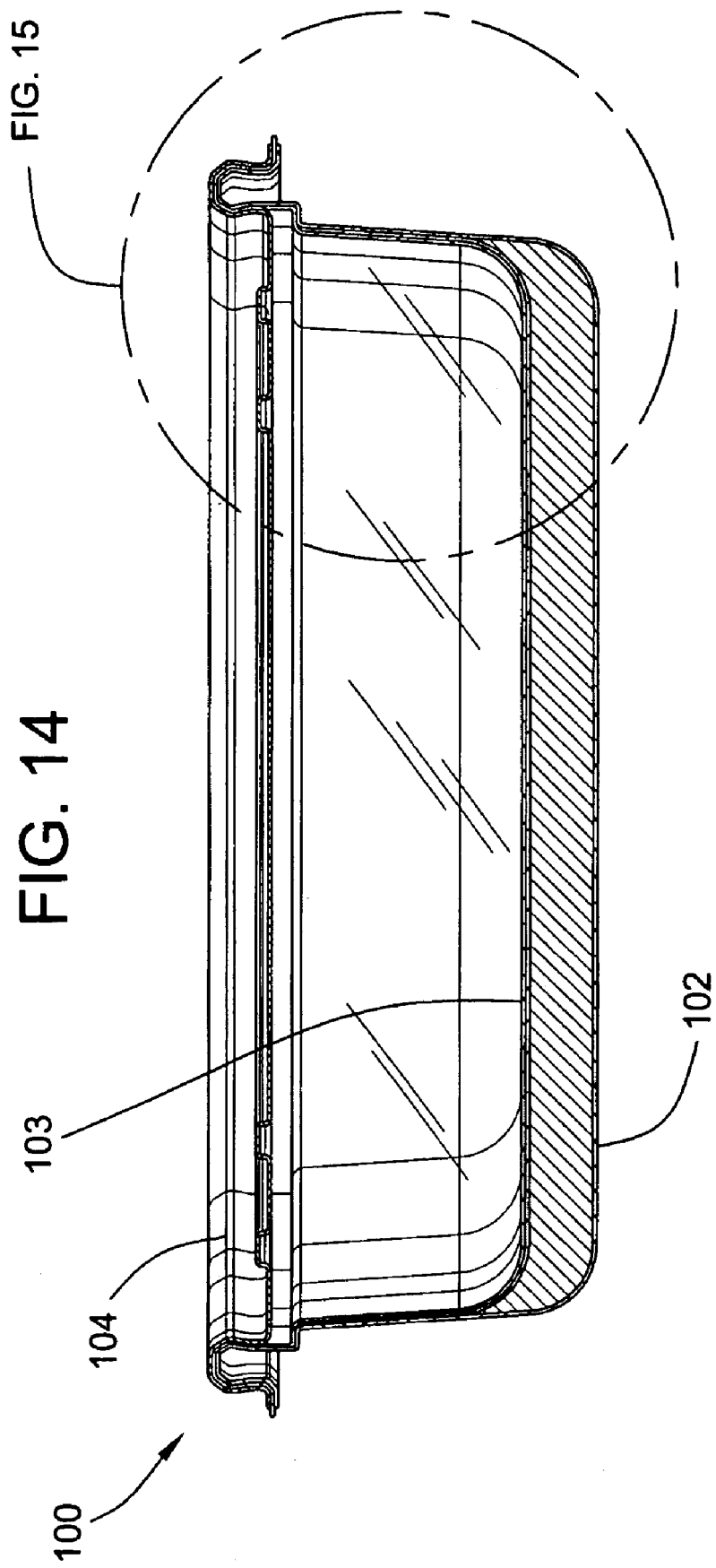
FIG. 14 is a cross-sectional view taken along line 14—14 in FIG. 2.
Figure 15:
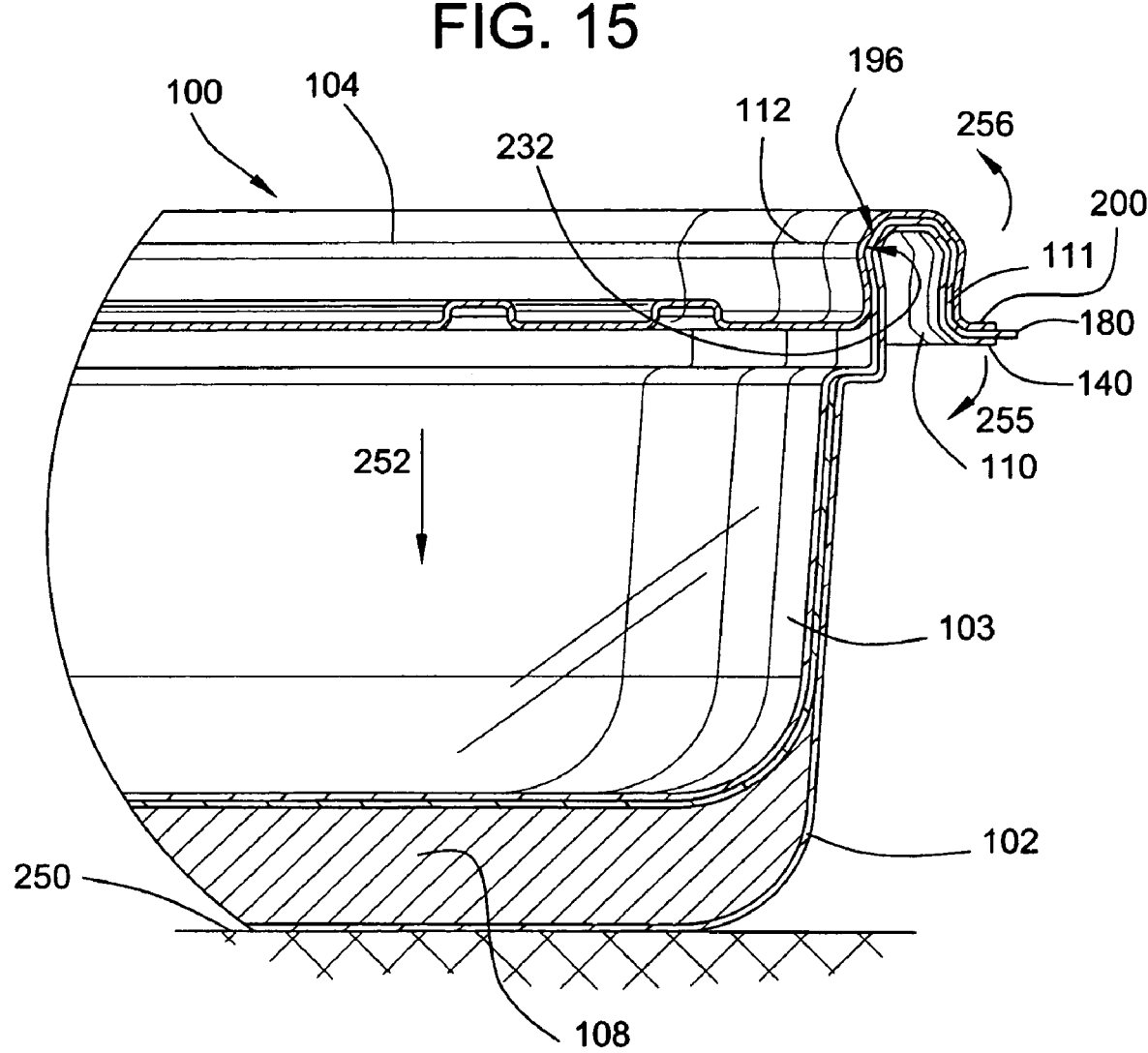
FIG. 15 is an enlarged, detail view of the area indicated in FIG. 14.

Referring to FIGS. 14 and 15, the container 100 is shown in a sealed condition. The insert 103 is sealingly secured to the base 102, and the cover 104 is sealingly secured to the insert 103. The cover 104 and the insert 103 cooperate to define a sealed compartment. The cover 104 can be sufficiently flexible to allow the user to create a vacuum in the container upon sealing. For example, in order to create a vacuum, the user can depress the cover 104 during the closing of the container. A return force imparted upon the cover generated by the resiliency of the material of the cover will urge the cover to return to its normal position, thereby creating a vacuum.

The relieved portions of the gripping tabs of the cover permit container venting by allowing a portion of the cover 104 to be removed from the insert 103 while still maintaining a seal around the remaining perimeter of the container. This feature is useful in microwave cooking where the cover 104 prevents food from splattering onto the inside surface of the microwave while still allowing the container to vent.

By utilizing at least one of the tabs, less force is required to remove the cover 104 from the insert 103. The lower opening force also reduces the possibility for container failure from stress and fatigue. The lower opening force can improve the ability of the user to maintain control over the container components while removing the cover from the base to reduce the possibility of spilling the contents stored in the container during removal of the cover from the insert and/or the base.

Referring to FIG. 15, the inner surface of the first closure portion 110 and the outer surface of the second closure portion 111 cooperate together to define a sealing engagement between the base 102 and the insert 103. The inner surface of the second closure portion 111 and the inner surface of the third closure portion 112 cooperate together to define a sealing engagement between the insert 103 and the cover 104 to provide a sealed food storage compartment. When the container 100 is used without the insert 103, a sealing engagement between the base 102 and the cover 104 can be established between the inner surface of the first closure portion 110 and the inner surface of the third closure portion 112.

The second and third closure portions 111, 112 can be configured to be slightly different in size to form an interference fit therebetween. The interference fit between the second and third closure portions can provide the sealing engagement between the closure portions to occlude the insert 103 and the cover 104. When the two pieces are engaged, a positive seal can be formed between the third and fourth sealing surfaces 196, 232 around the perimeter of the insert 103 and the cover 104. In one embodiment, the range of interference fit between the second and third closure portions 111, 112 is about 0.005 to about 0.020 inches.

At least one of the second and third closure portions 111, 112 can include at least one notch that defines an air passageway between the insert 103 and the cover 104 when the closure portions 111, 112 of the insert and the cover undergo an occlusion sequence. Examples of such a notch can be found in U.S. patent application Ser. No. 10/387,283 to Tucker. When the container 100 is used without the insert 103, a sealing engagement between the base 102 and the cover 104 can be established between the inner surface of the first closure portion 110 and the inner surface of the third closure portion 112.

In the occluded position, as shown in FIG. 15, the inner and outer walls of the closure portions 110, 111, 112 can be displaced from their normal position to an intermediate engaged position. The second and third closure portions 111, 112 cooperate when in the occluded position to close the air passageway to provide a substantially continuous seal between the cover 104 and the insert 103. The closure portions can have several other sealing areas when the cover and the insert engage the base.

Referring to FIG. 15, when the closure portions 110, 111, 112 are sealingly engaged with each other, the flange 140 of the base 102 is closely adjacent the flange 180 of the insert 103 and the flange 200 of the cover 104. The flange 180 of the insert can be resiliently flexible such that the flange 180 can be flexed away from the cover 104 in a first direction 255 to provide a separation between the flanges 180, 200 for facilitating the removal of the cover 104 from the insert 103 and away from the base 102 in a second direction 356, which opposes the first direction 355, for facilitating the removal of the insert 103 from the base 102.

The container 100 can be used, for example, by activating the thermal generator 108 of the base 102. Depending upon the thermal media which comprises the thermal generator, thermal energy can be stored within the thermal generator by microwaving the base 102 or by placing the base 102 in a freezer, for example. In embodiments where the thermal generator comprises two or more chemicals which are kept separated until it is desired to generate thermal energy, the chemicals can be mixed together by applying manual pressure to the media such that the capsulation structure separating the chemicals is ruptured to allow the chemicals to mix together.

The base 102 can be placed on a supporting surface 250, and the insert 103 can be disposed within the base 102. The insert 103 can be moved toward the base 102 with the supporting surface 250 holding the base in place to allow the closure portions 110, 111 to sealingly engage the insert 103 to the base 102. To occlude the insert 103 and the base 102, a sealing force is applied to the insert 103 in a sealing direction 252 such that the sealing force moves the insert 103 and the base 102 toward each other. The insert 103 and the base 102 are disposed between the application of the sealing force and the supporting surface 250 to overcome the interference between the closure portions 110, 111. The insert 103 and the base 102 can be occluded by aligning the first closure portion 110 with the second closure portion 111 and applying a force from underneath the first closure portion 110 and an oppositely directed force from above the second closure portion 111 as would be accomplished by pinching, and then applying this force all the way around the closure perimeters so as to completely occlude the two components. One or more items of food can be disposed within the insert 103.

The cover 104 can be mounted to the insert 103 to close the storage compartment defined therein and to seal the container 100. The cover 104 can be placed in sealing engagement with the insert 103 in much the same way as the insert 103 is sealed to the base 102. The second and third closure portions 111, 112 can be occluded in the same manner as the first and second closure portions 110, 111. In addition, the engagement of the first and second closure portions 110, 111, as well as the second and third closure portions 111, 112, in an occluded position can be accompanied by an audible "snap," indicating that the container is securely closed.

Figure 16:
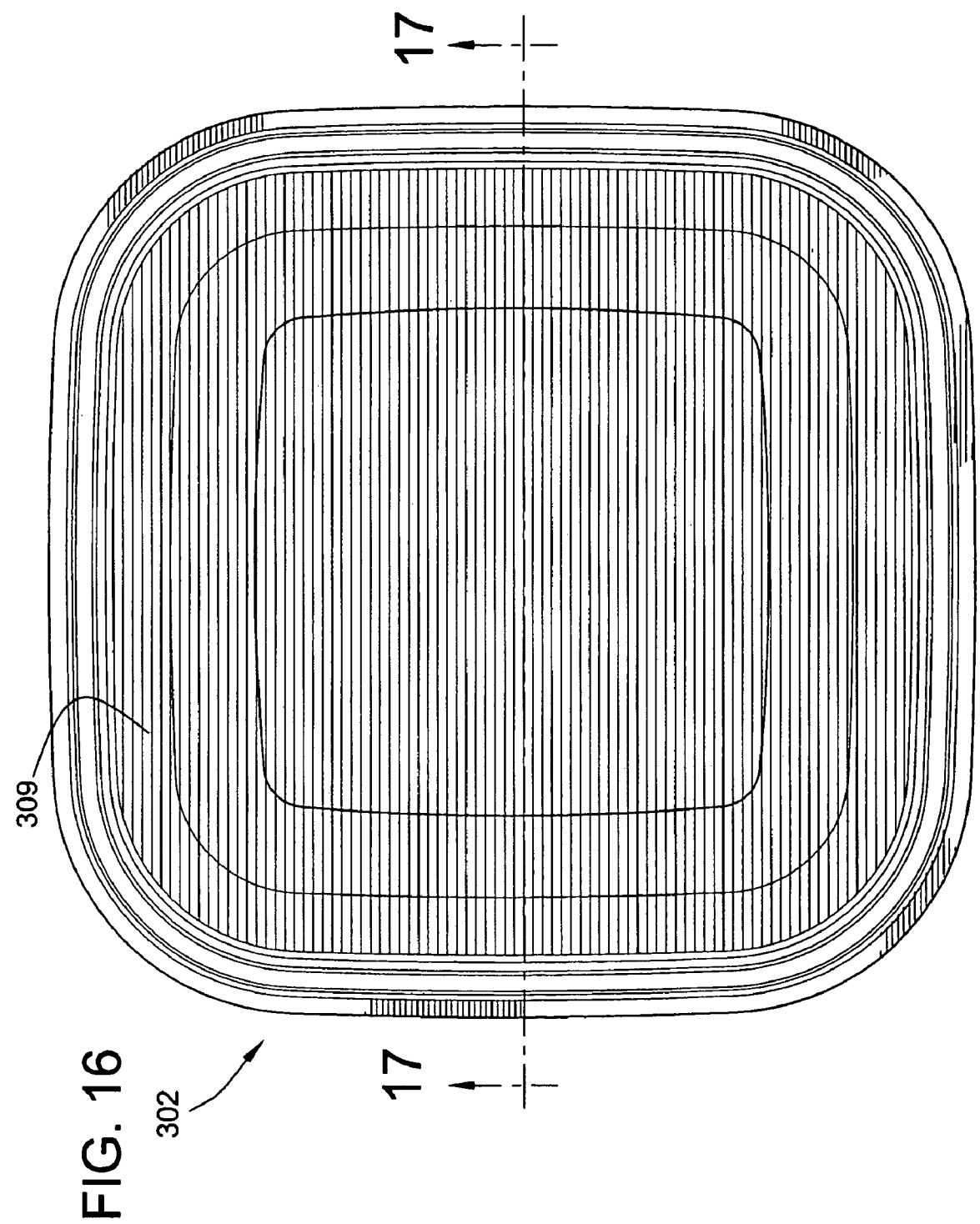
FIG. 16 is a top plan view of another embodiment of a base for use in a container according to the present invention.
Figure 17:
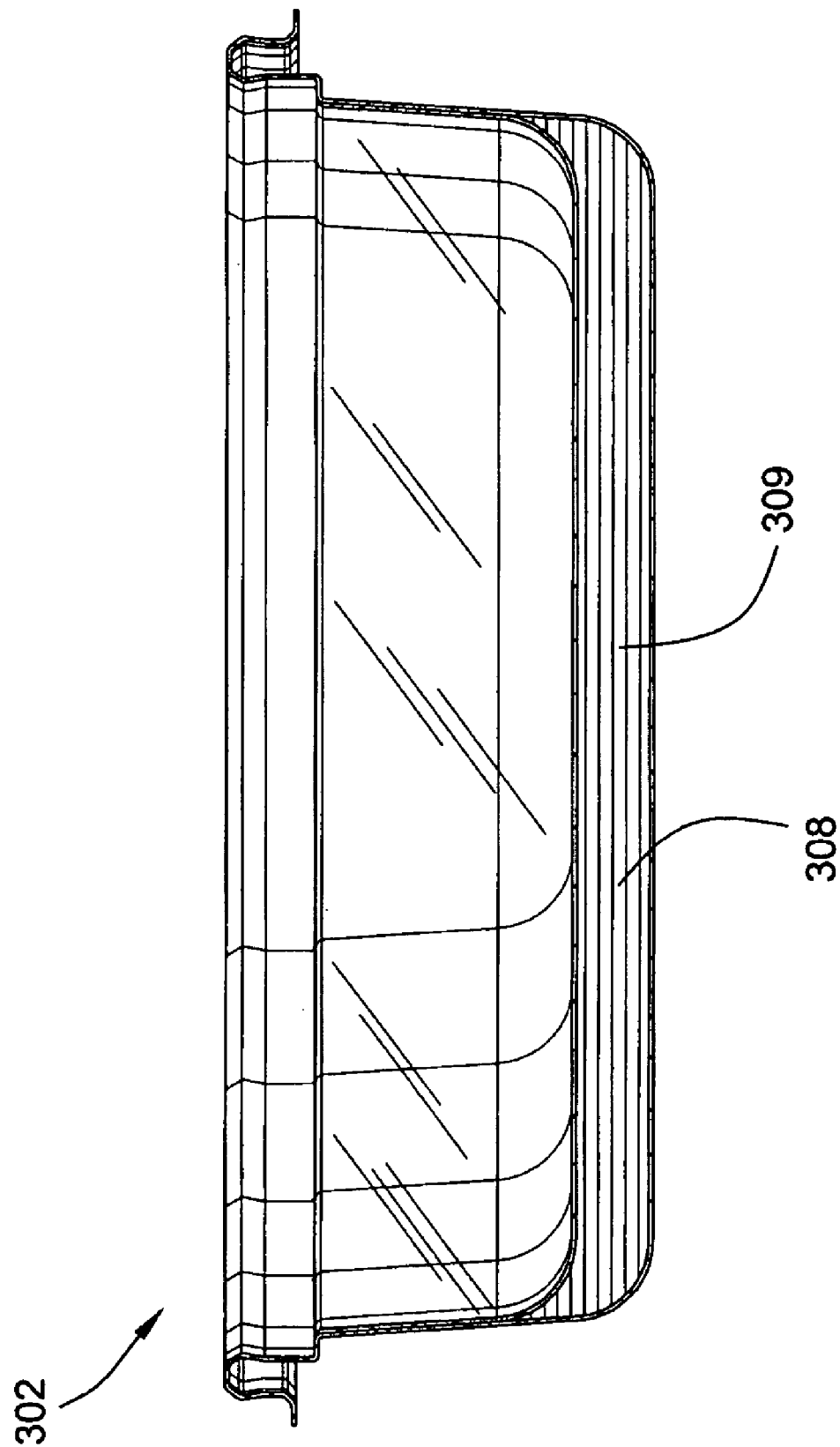
FIG. 17 is a cross-sectional view taken along line 17—17 in FIG. 16.

Referring to FIGS. 16 and 17, another embodiment of a base 302 is shown that is useful in connection with a container according to the present invention. The base 302 can be used with an insert and a cover. Referring to FIG. 17, the base 302 includes a thermal generator 308 which includes a visual indication of the thermal energy properties of the base 302. In this embodiment, the indication is in the form of a thermal media which has a color 309, a translucent blue, for example, which indicates that the base 302 is suitable for acting as a cooler. The base 302 of FIG. 16 is similar in other respects to the base 102 of FIG. 1.

Figure 18:
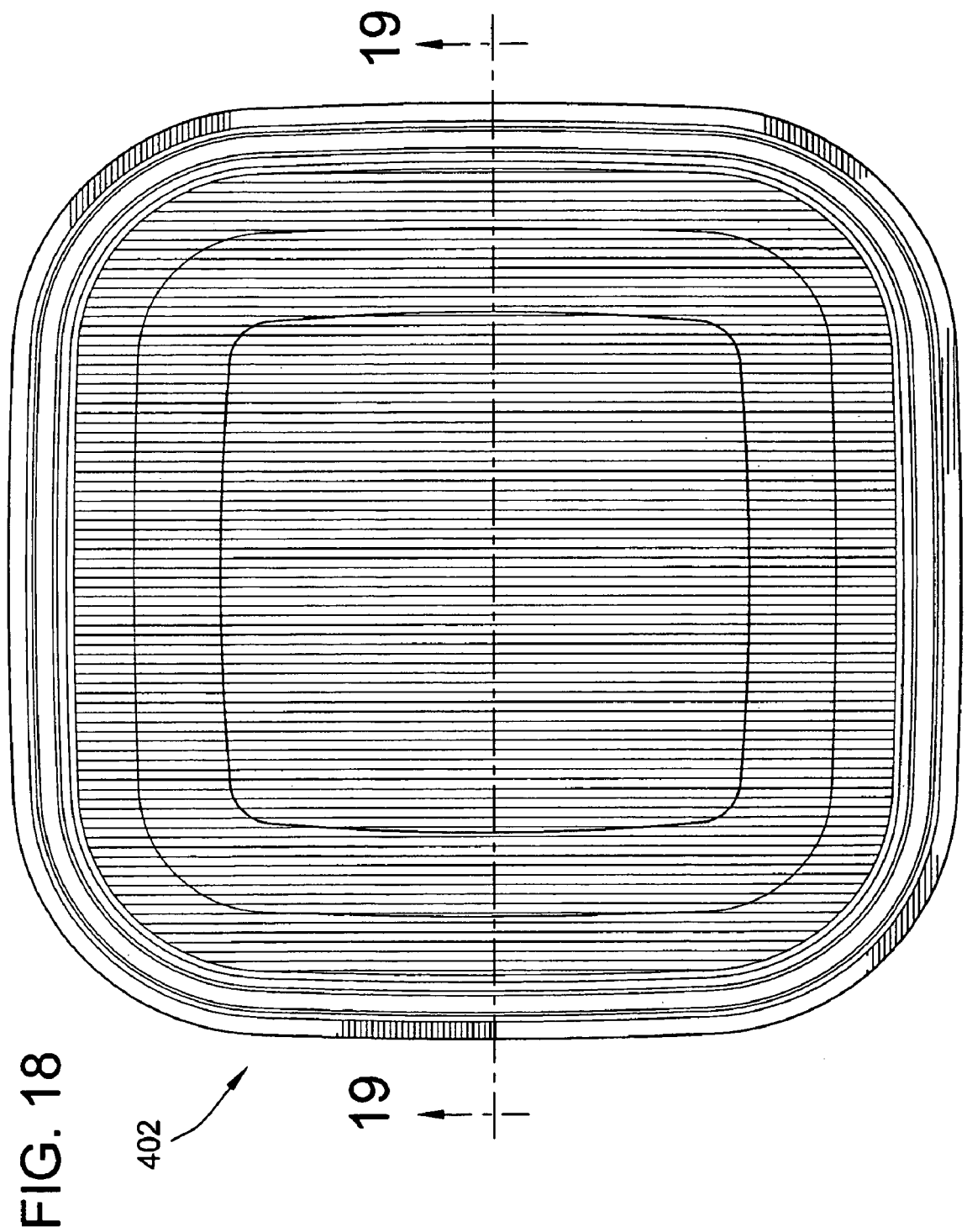
FIG. 18 is a top plan view of another embodiment of a base for use in a container according to the present invention.
Figure 19:
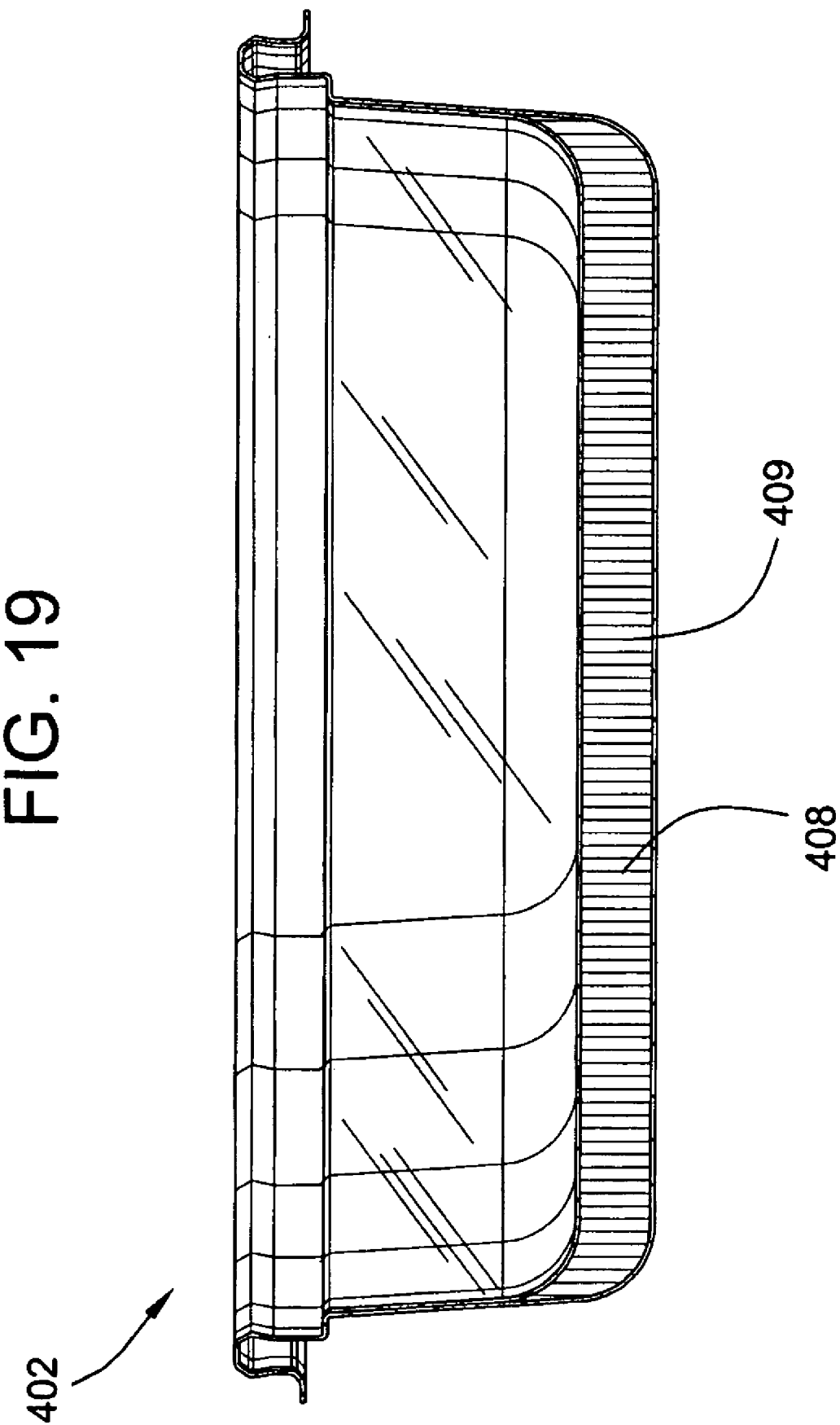
FIG. 19 is a cross-sectional view taken along line 19—19 in FIG. 18.

Referring to FIGS. 18 and 19, another embodiment of a base 402 is shown that is useful in connection with a container according to the present invention. The base 402 can be used with an insert and a cover. Referring to FIG. 19, the base 402 can include a thermal generator 408 similar to that of the base 302 of FIG. 16 except that the thermal media can be a translucent red 409 to indicate that the base 402 is useful for acting as a heater.

Figure 20:
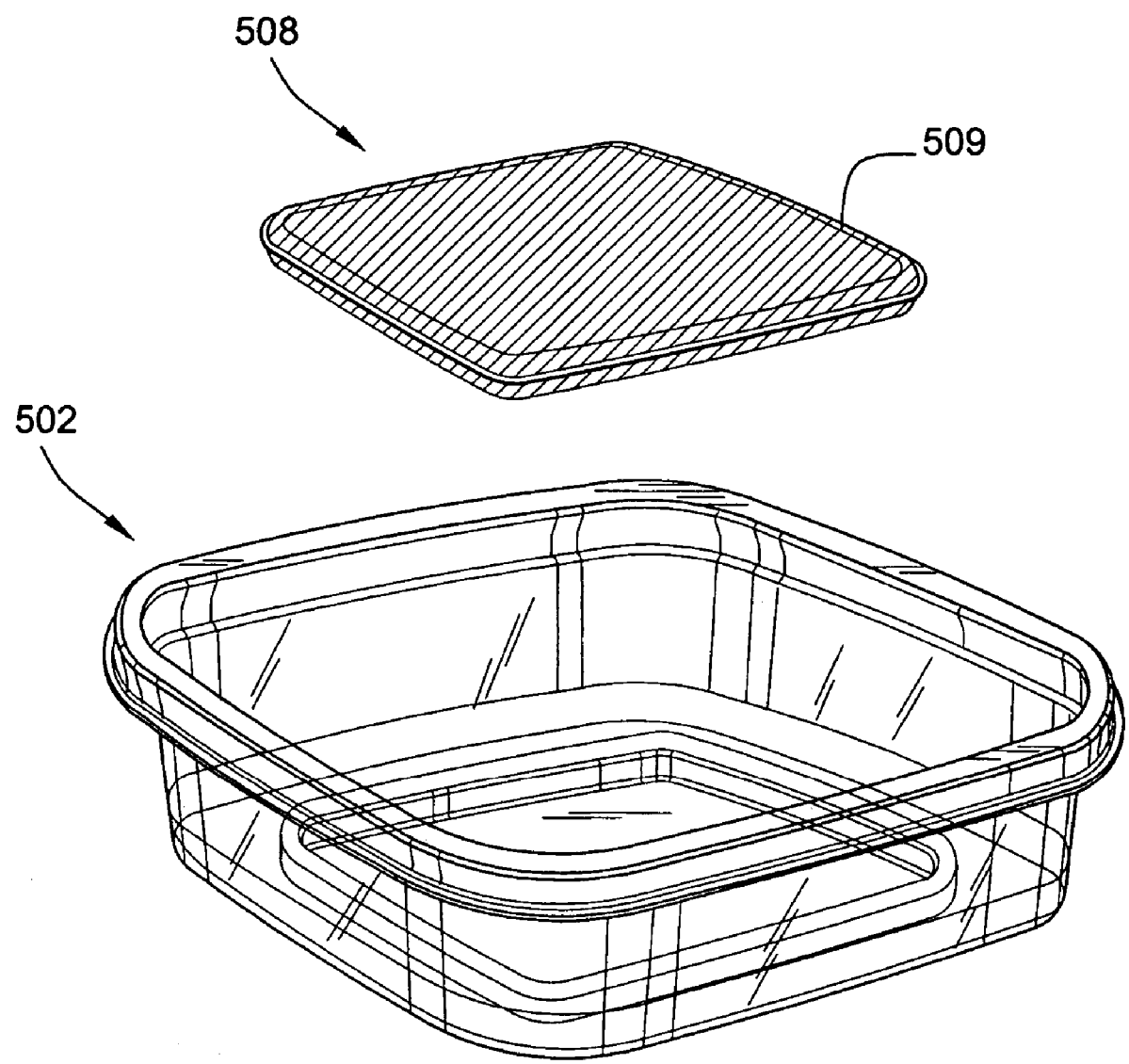
FIG. 20 is an exploded view of another embodiment of a base and a media packet for use in a container according to the present invention, the media packet being disposable in the base.
Figure 21:
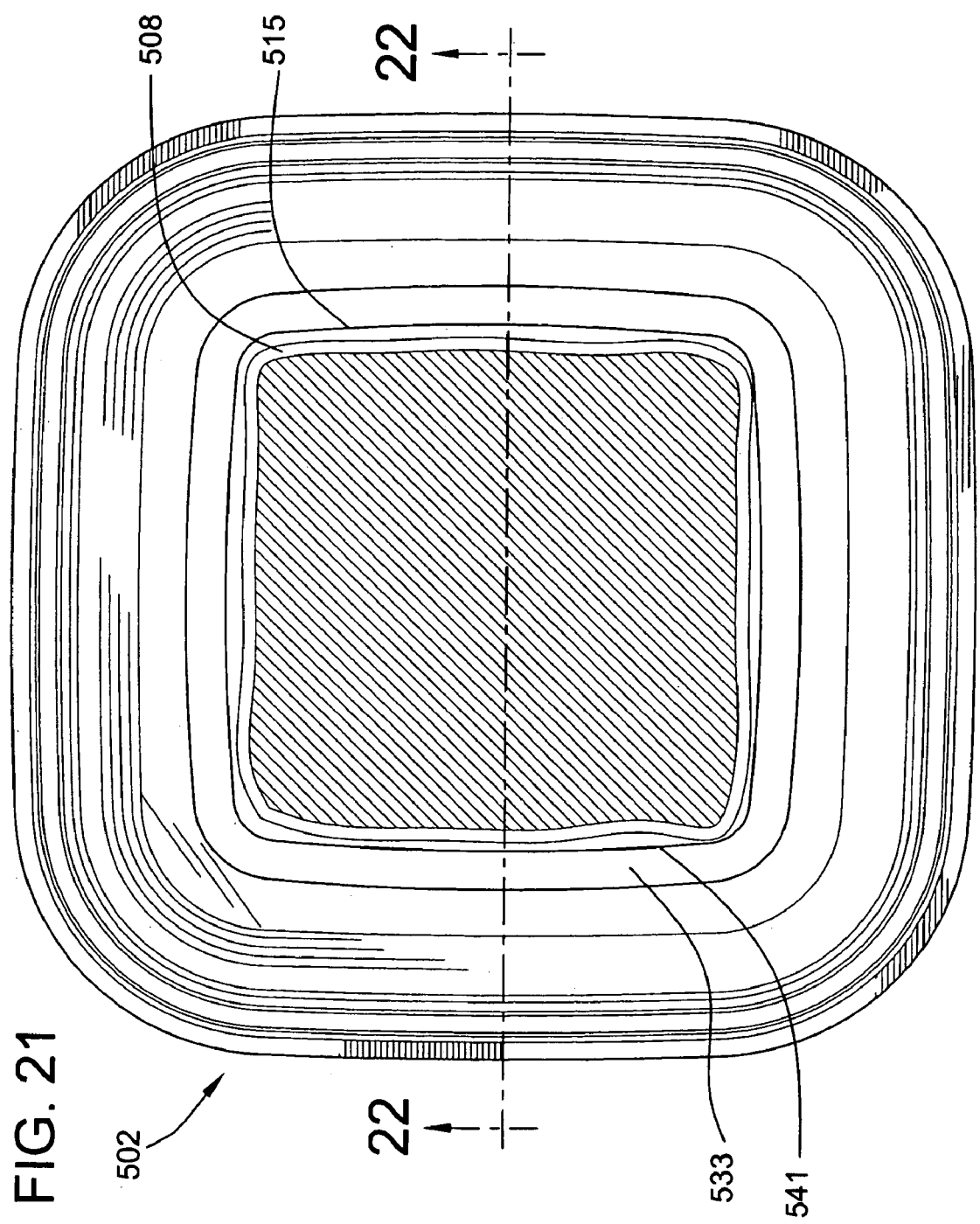
FIG. 21 is a top plan view of the media packet and the base of FIG. 20.

Referring to FIGS. 20–22, another embodiment of a base 502 is shown that is useful in connection with a container according to the present invention. The base 502 can be used with an insert and a cover. The base 502 can include a removable thermal generator 508 in the form of a media packet. In this embodiment, the thermal media packet 508 can be placed in either a freezer or a microwave, for example, depending upon the type of thermal energy desired to be supplied, and the base 502 can remain outside of such freezer or microwave, thereby reducing the amount of space required in the freezer or microwave and also removing any obstruction that the sidewall and other portions of the base may pose to imparting thermal energy upon the thermal media packet 508.

The media packet 508 can include a flexible plastic pouch 509 that houses thermal media. The pouch 509 can be made via conventional manufacturing techniques. For example, the pouch 509 can be made from two flexible membrane walls which are heat sealed together around their perimeters. The media packet can include a thermal media, such as any thermal media previously discussed herein. Examples of suitable media packets include Reactro heating and cooling media pack or other commercially available hot and cold packs for example.

Referring to FIG. 21, the media packet 508 is shown disposed in a well 515 of the base 502. The media packet 508 is substantially square shaped when viewed in top plan and is generally flat when viewed from the side (see FIG. 22). The well 515 can be configured to substantially correspond to the shape of the media packet 508.

Referring to FIG. 22, the base 502 includes a bottom 520 which defines the well 515. The bottom 520 includes a raised support portion 533 and a recessed portion 535 which are in spaced relationship with each other by an amount determined by an offset member 536. The support portion 533 defines a well opening 541 (also shown in FIG. 21). The recessed portion 535 defines a well bottom. The offset member 536 defines the depth of the well 515 and can be sized such that when the media packet 508 is disposed within the well 515 with a first face 518 resting on the recessed portion 535, a second face 519 of the media packet 508 is disposed in substantially planar relationship with the support portion 533 of the bottom 520. The support portion 533 can be configured such that it can provide support for an insert which is disposed within the cavity 542 of the base 502. The base 502 can be similar in other respects to the base 102 shown in FIG. 1.

Figure 22A:
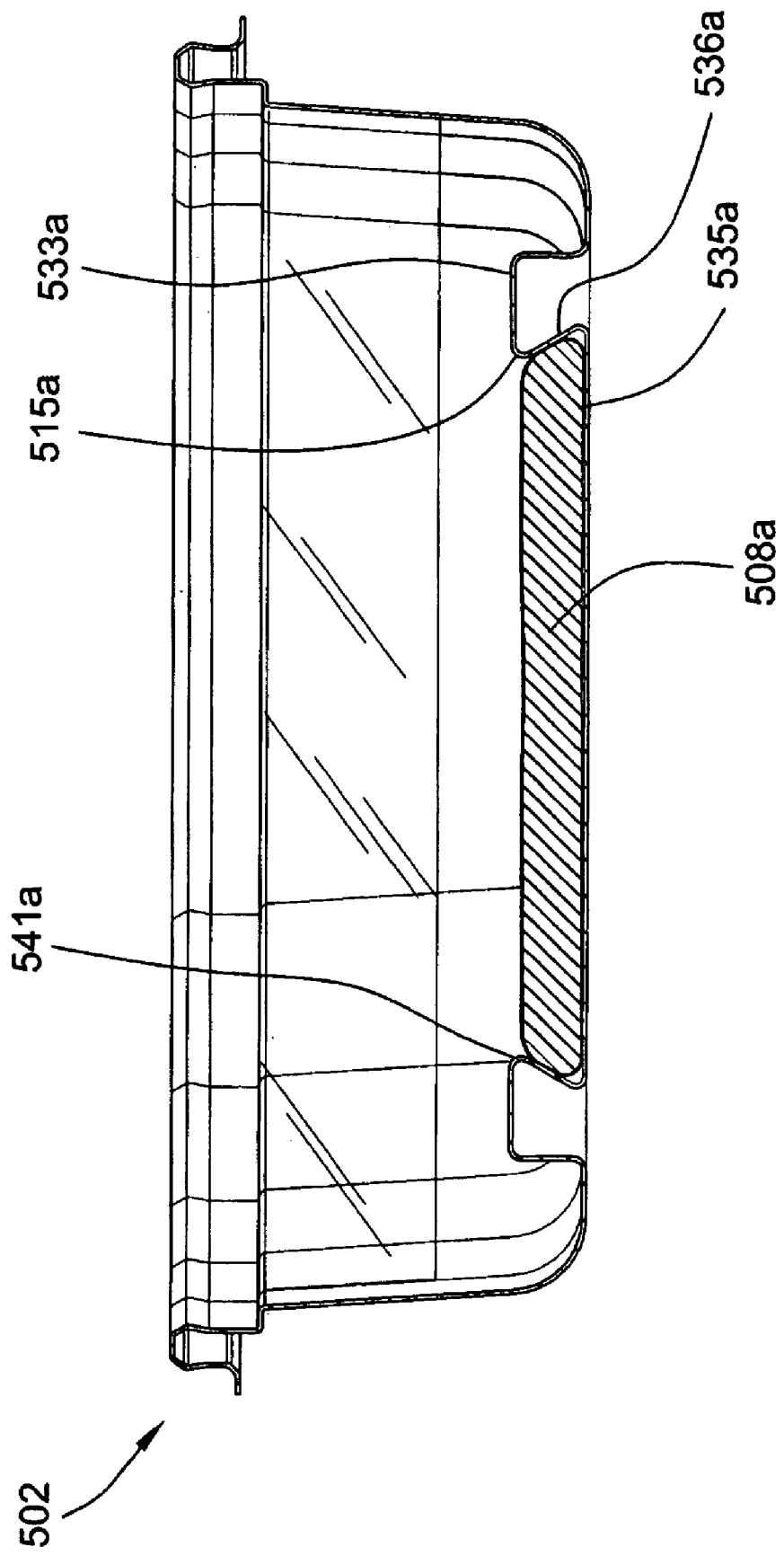
FIG. 22A is a cross-sectional view similar to FIG. 22 of another embodiment of a base for use in a container according to the present invention, the base having a media packet releasably mounted thereto.

Referring to FIG. 22A, another embodiment of a base 502a is shown that is useful in connection with a container according to the present invention. The base 502a can be used with an insert and a cover. The base 502a is similar to the base 502 of FIG. 20 except that the base 502a of FIG. 22A includes a well 515a which is tapered to provide an interlocking feature. The well 515a includes a support portion 533a that defines a well opening 541a, a recessed portion 535a that defines a well bottom, and a tapered offset member 536a extending therebetween that defines the depth of the well 515a. The well opening 541a can be smaller than the well bottom such that the offset member 536a tapers outwardly from the well opening 541a toward the well bottom. The tapered configuration can cooperate with the media packet 508a to provide an interlocking fit therebetween such that the media packet 508a is releasably engaged with the base 502a.

The tapered well 515a can comprise a closed loop such that the offset member 536a defines a continuous, bounded surface. In other embodiments, the support portion 533a and/or the offset member 536a can be discontinuous so as to define a well in the form of a channel to facilitate the insertion of the media packet into interlocking engagement therewith. In yet other embodiments, the base can include a well which is accessible from the exterior surface of the base such that the thermal source can be mounted to the exterior of the base.

Figure 23:
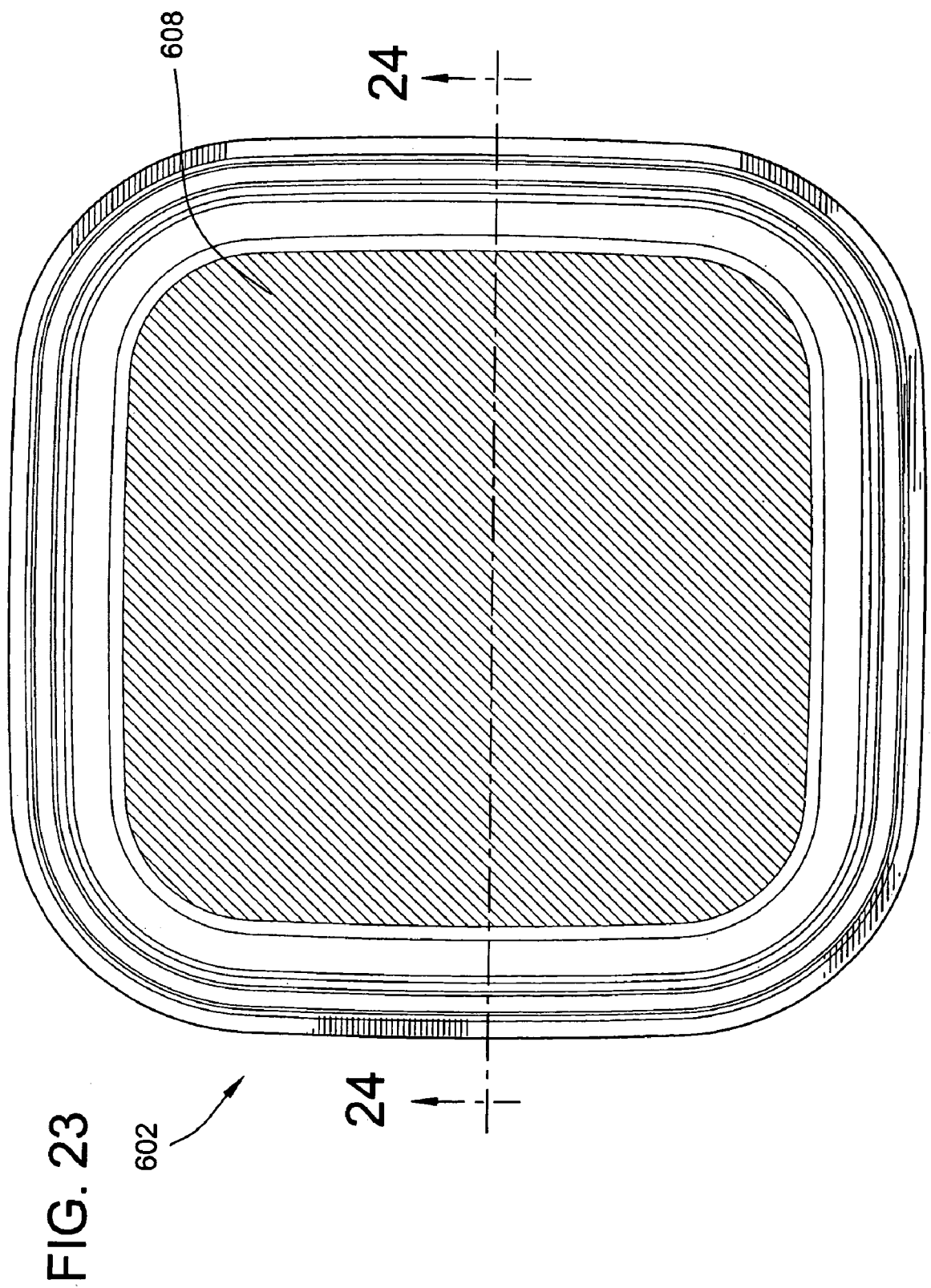
FIG. 23 is a top plan view of another embodiment of a base and a media packet for use in a container according to the present invention, the media packet mounted to the base.
Figure 24:
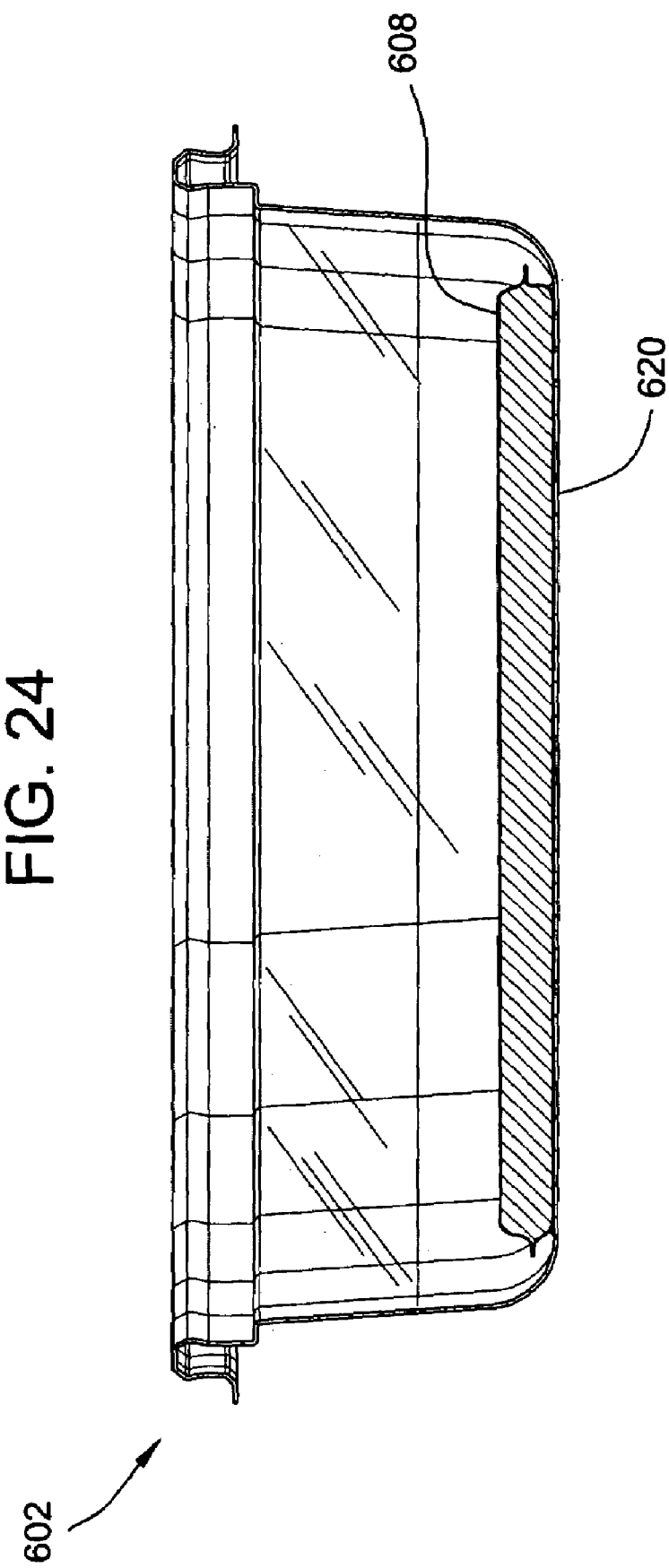
FIG. 24 is a cross-sectional view taken along line 24—24 in FIG. 23.

Referring to FIGS. 23 and 24, another embodiment of a base 602 useful in connection with a container according to the present invention is shown. The base 602 can be used with an insert and a cover. The base 602 includes a thermal generator 608 in the form of a thermal media packet similar to that of the base 502 of FIG. 20. In this embodiment, the partition wall is omitted, as shown in FIG. 24. The base 602 can be similar in other respects to the base 102 of FIG. 1. In one embodiment, the media packet is attached to a bottom 620 of the base 602 by fusing the packet thereto. In other embodiments, the media packet can be attached to the bottom 620 by other techniques or can be removably disposed within the base 602.

Figure 26:
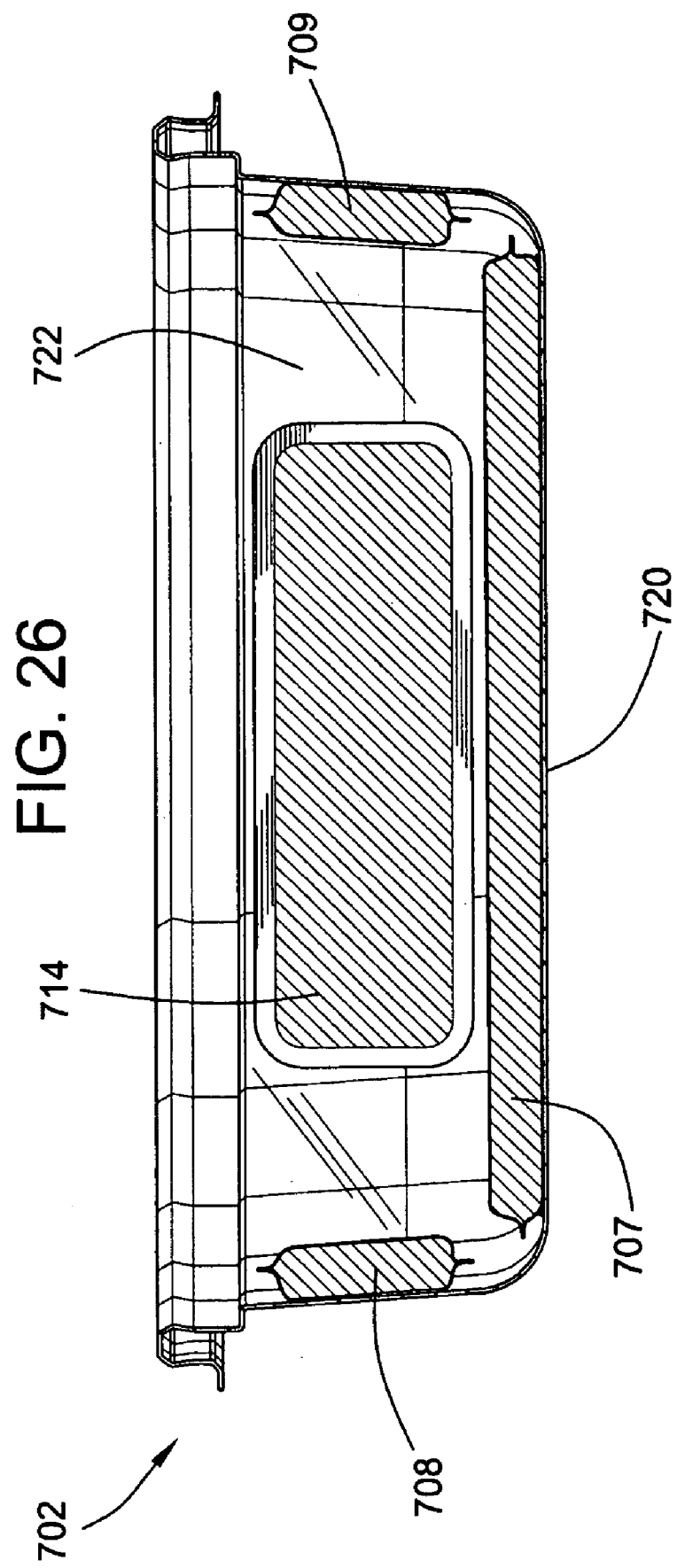
FIG. 26 is a cross-sectional view taken along the line 26—26 in FIG. 25.

FIGS. 25 and 26 show another embodiment of a base 702 useful in connection with a container according to the present invention. The base 702 can be used with an insert and a cover. The base 702 includes a thermal generator in the form of a plurality of thermal media packets 707, 708, 709, 713, 714. The first thermal packet 707 can be attached to a bottom portion 720 of the base 702. The first media packet 707 can be sized such that it generally corresponds to the bottom of the base. The other thermal media packets 708, 709, 713, 714 can be attached to a sidewall portion 722 of the base 702 such that a thermal media packet is mounted to each sidewall panel of the sidewall portion. The sidewall thermal media packets 708, 709, 713, 714 can be substantially similar to each other in shape and in construction. The base 702 can be similar in other respects to the base 602 of FIG. 23. The media packets can be attached by fusing, adhesive, heat sealing, ultrasonic welding, or laser point welding, for example. In addition, the media packets can be removably disposed within the base 702. For example, the first thermal media packet 707 can be placed upon the bottom 720 of the base. The sidewall thermal media packets can be removably attached to the sidewall 722 by hook and loop fasteners, undercut snaps, or channeled walls, for example.

Referring to FIG. 25A, another embodiment of a base 702a is shown that is useful in connection with a container according to the present invention. The base 702a can be used with an insert and a cover. The base 702a includes a thermal generator in the form of a plurality of thermal media packets 707a, 708a, 709a, 713a, 714a, with four of the five thermal media packets being releasably mounted to the sidewall 722a of the base 702a. The sidewall 722a has a well in the form of a channel 715a for each of the sidewall thermal packets 708a, 709a, 713a, 714a. Each channel 715a defines a groove 717a configured to accommodate one of the sidewall thermal packets. Each channel 715a can extend a predetermined distance along the sidewall 722a.

A sidewall thermal packet can be releasably mounted to the base 702a by aligning the packet over the groove and sliding the packet into the groove 717a, moving the packet toward the bottom of the base 702a, such that the channel 715a retentively engages the packet to prevent it from falling inwardly. Each sidewall thermal packet can be removed by sliding it out of the groove of the respective channel 715a in which it is mounted.

Figure 27:
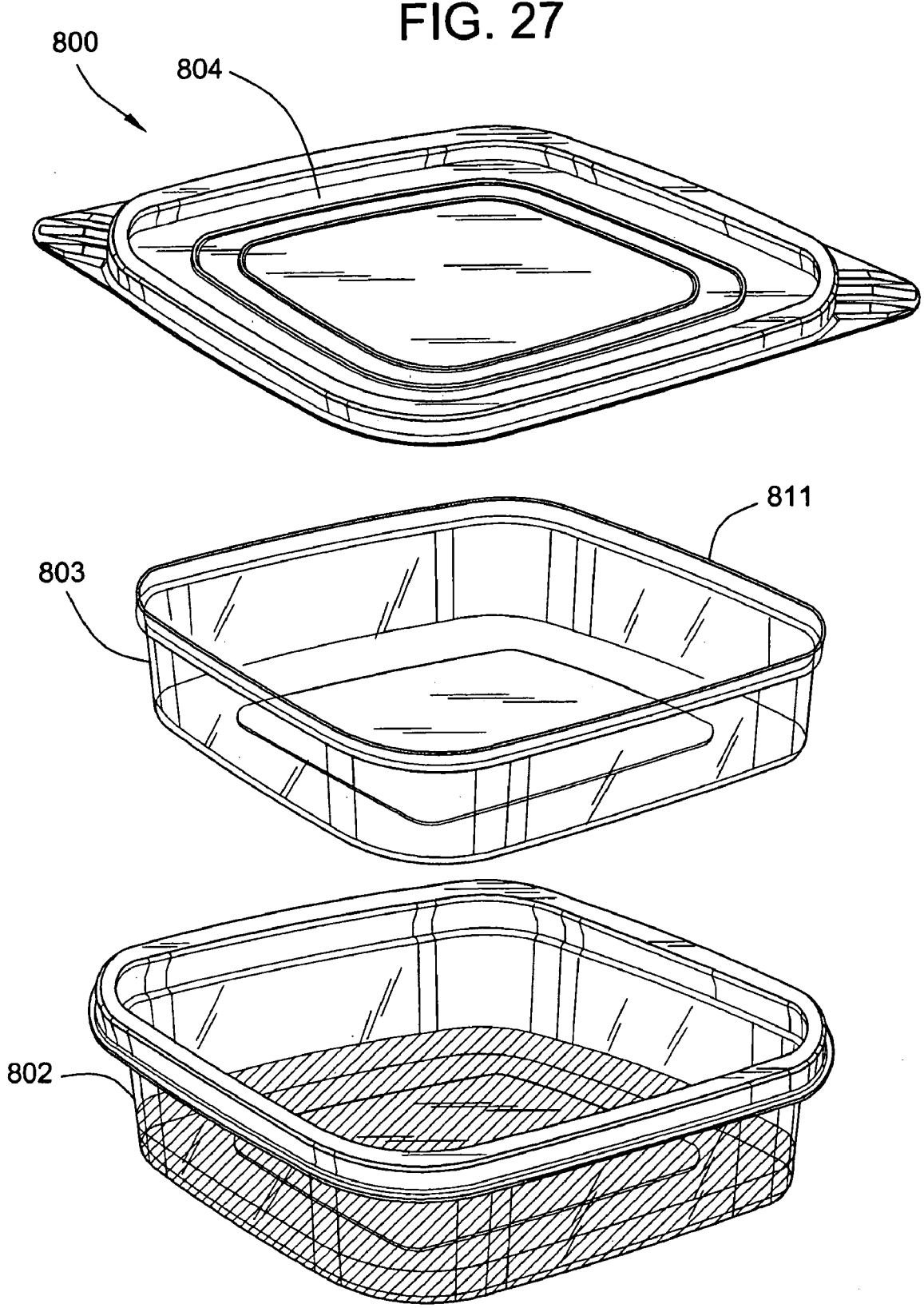
FIG. 27 is an exploded view of another embodiment of a container according to the present invention.
Figure 28:
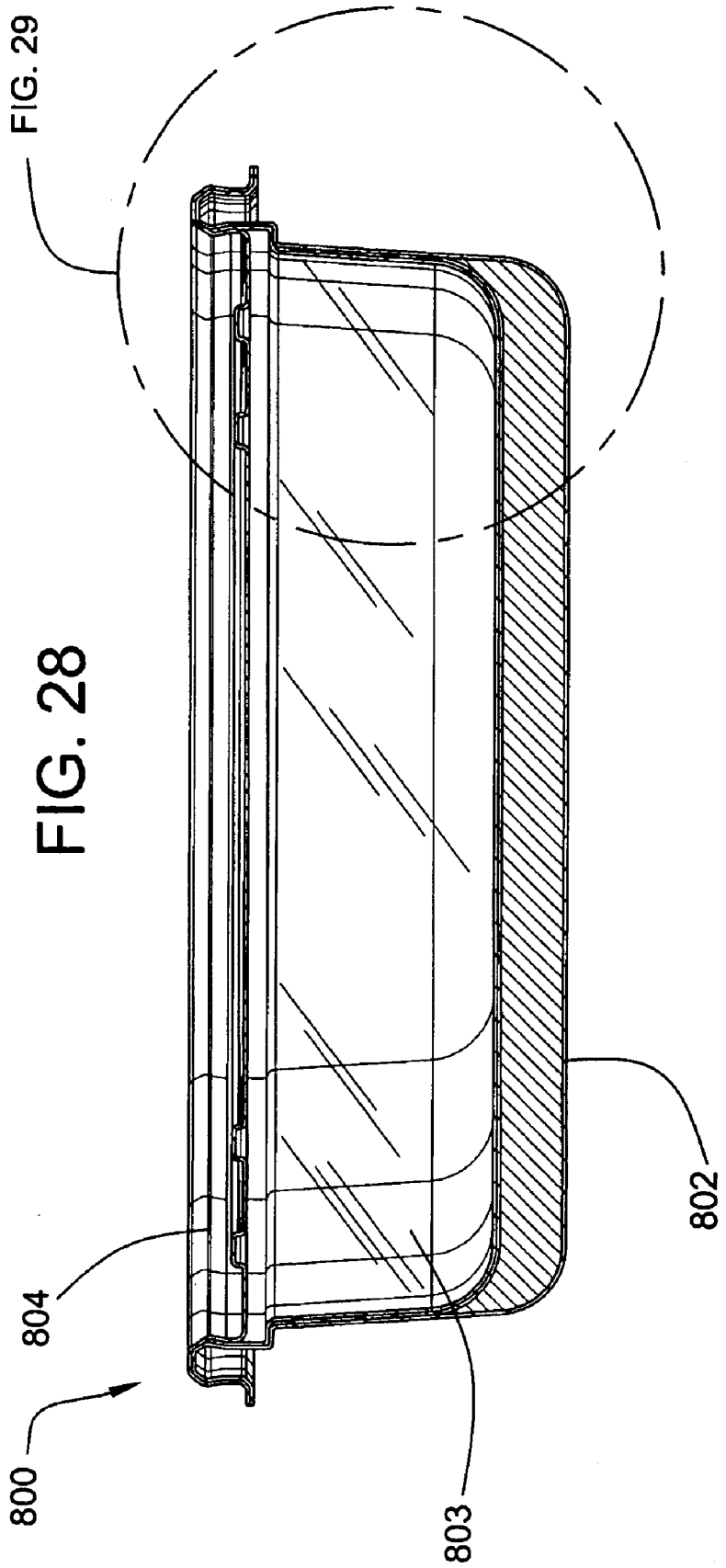
FIG. 28 is a sectional view of the container of FIG. 27.
Figure 29:
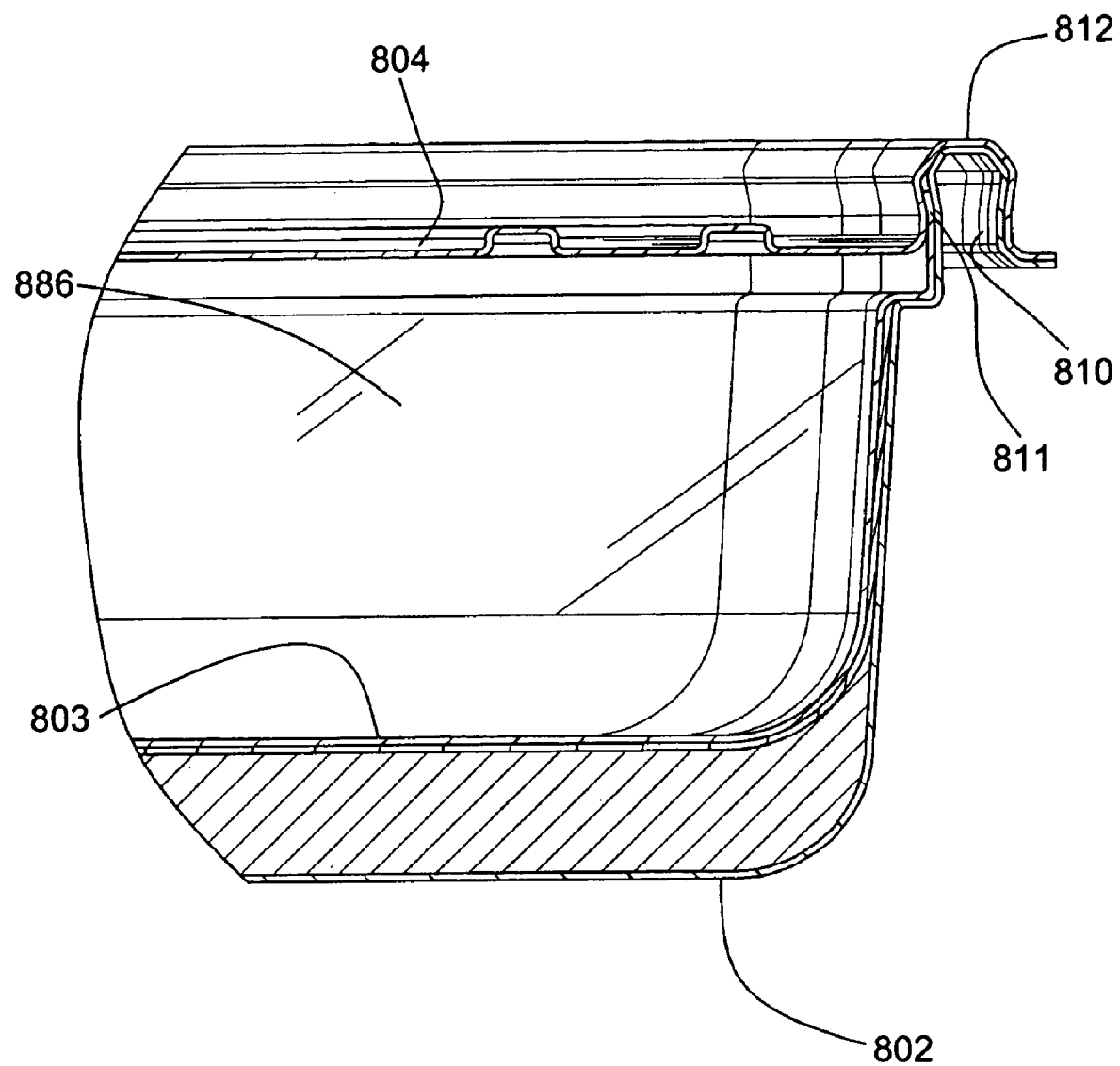
FIG. 29 is an enlarged, detail view of the area indicated in FIG. 28.

Referring to FIGS. 27–29, another embodiment of a container 800 according to the present invention is shown. The container 800 includes a base 802, an insert 803, and a cover 804. The base 802 and the cover 804 are similar to the base 102 and the cover 104 of FIG. 1, respectively. The insert 803 of FIG. 27 is similar to the insert 103 of FIG. 1 except that it has a different closure portion 811. The insert 803 includes a second closure portion 811 in the form of a seal rim. The seal rim 811 extends around the perimeter of the insert 803 and is in the form of a generally planar wall.

Referring to FIG. 28, the container 800 is shown in a sealed condition. The insert 803 is disposed within the base 802, and the cover 804 is sealingly engaged to the base 802. The insert 803 is sealingly engaged with the cover 804.

Referring to FIG. 29, the base 802 has a first closure portion 810 which is sealingly engaged with a third closure portion 812 of the cover 804. The second closure portion 811 is sealingly engaged with the inner wall of the third closure portion 812 to form a sealed food storage compartment 886 between the cover 804 and the insert 803. The first and third closure portions 810, 812 are engaged such that the cover is mounted to the base. The container 800 is similar in other respects to the container 100 of FIG. 1.

Figure 30:
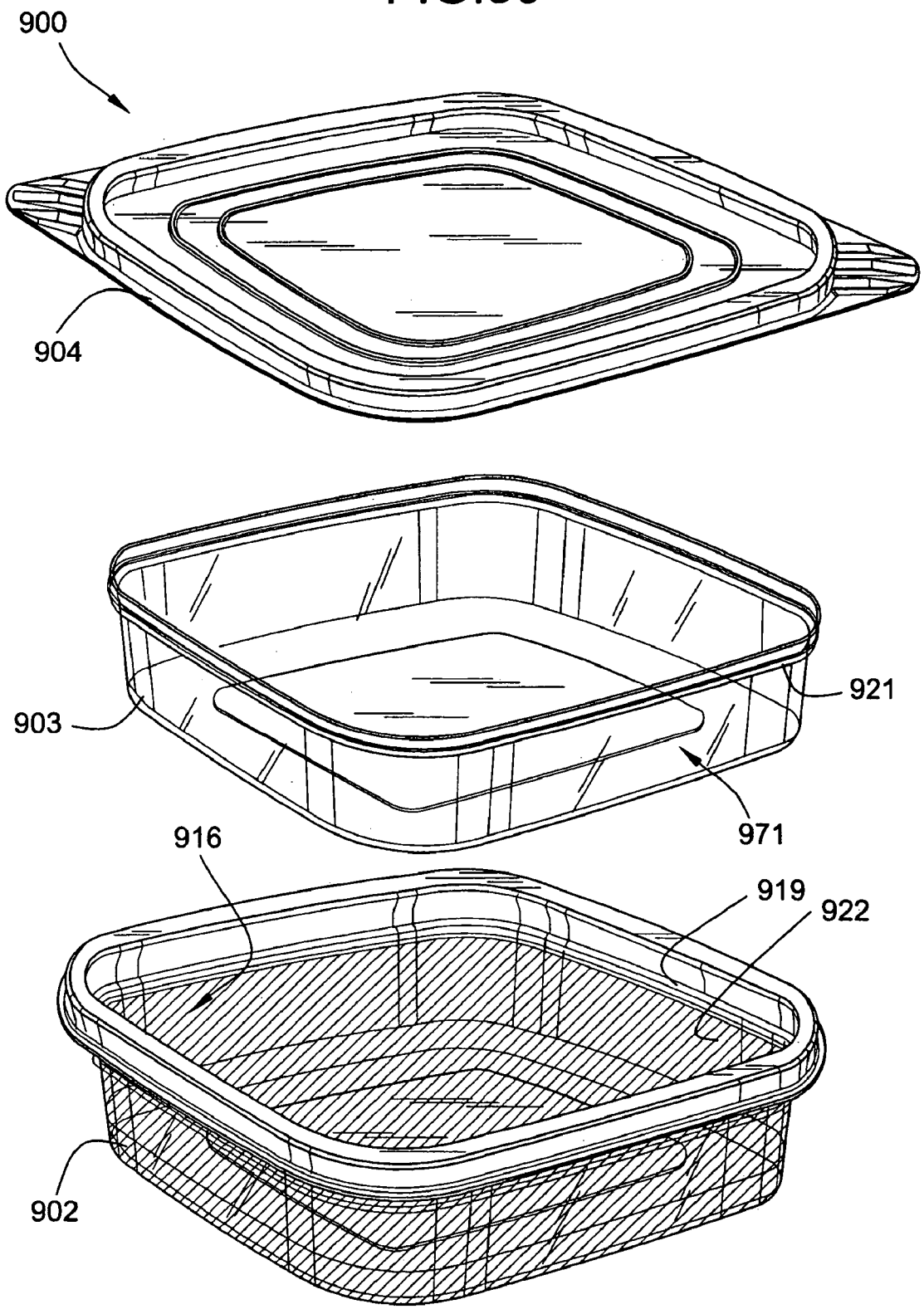
FIG. 30 is an exploded view of another embodiment of a container according to the present invention.

Referring to FIGS. 30–33, another embodiment of a container 900 according to the present invention is shown. Referring to FIG. 30, the container 900 includes a base 902, an insert 1003, and a cover 904. The cover 904 is similar to the cover 104 of FIG. 1. The base 902 is substantially similar to the base 102 of FIG. 1 except that it includes a detent groove 919 extending around a sidewall 922 thereof. The insert 903 includes a rib 921 on its exterior surface which is complementary to the detent groove 919 defined on the interior surface 916 of the base 902. The insert 903 does not include a closure portion.

Figure 31:
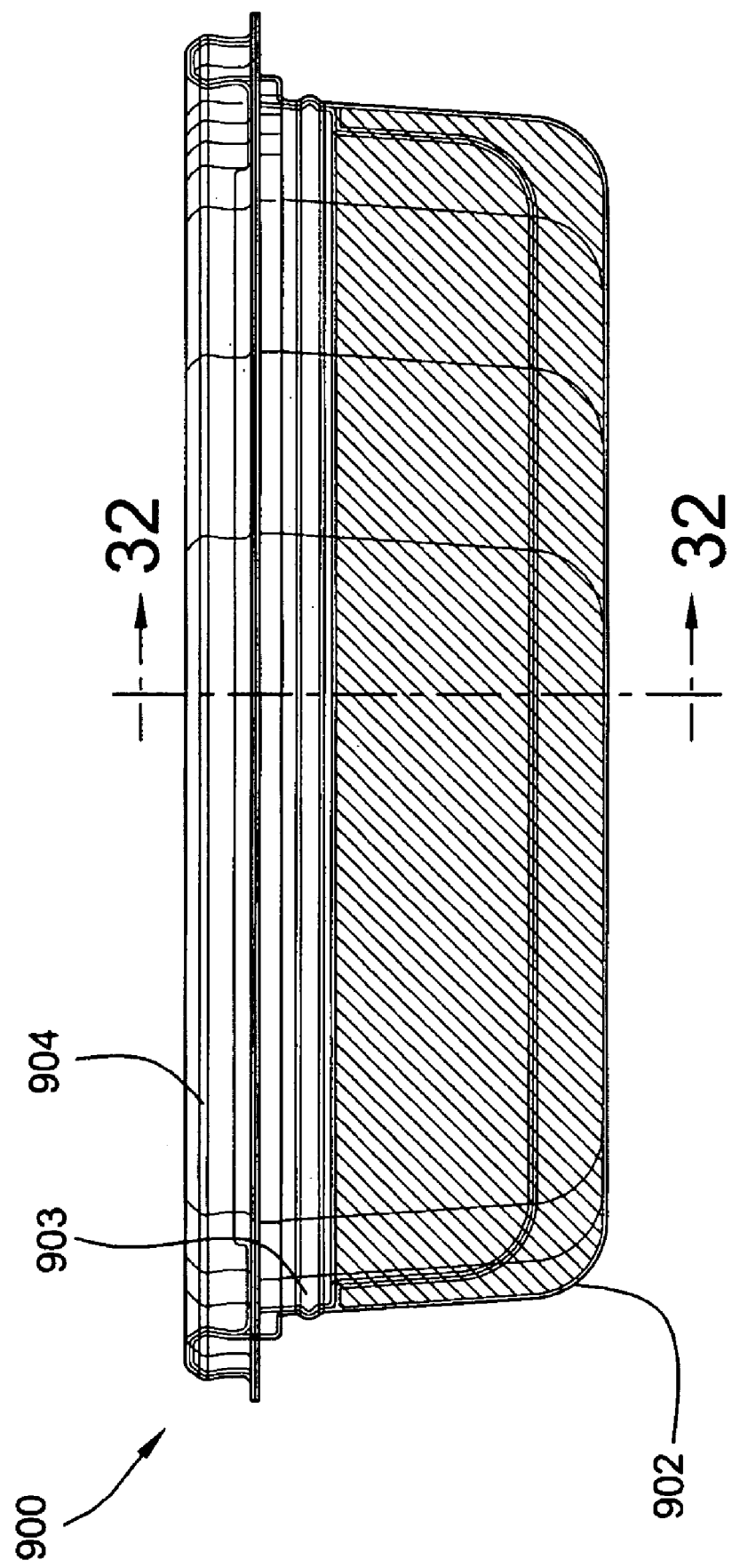
FIG. 31 is a side elevational view of the container of FIG. 30.

Referring to FIG. 31, the container 900 is shown in a sealed condition. The insert 903 is mounted to the base 902, and the cover 904 is sealingly engaged with the base 902. Referring to FIG. 32, the base 903 includes a partition 932 that includes a bottom panel 935, a side panel 936, and an upper shoulder portion 937. The partition 932 cooperates with a bottom 920 of the base and a sidewall portion 922 of the base to define a storage area 934 for the storage of a thermal generator 908, in this case in the form of a thermal gel.

Figure 33:
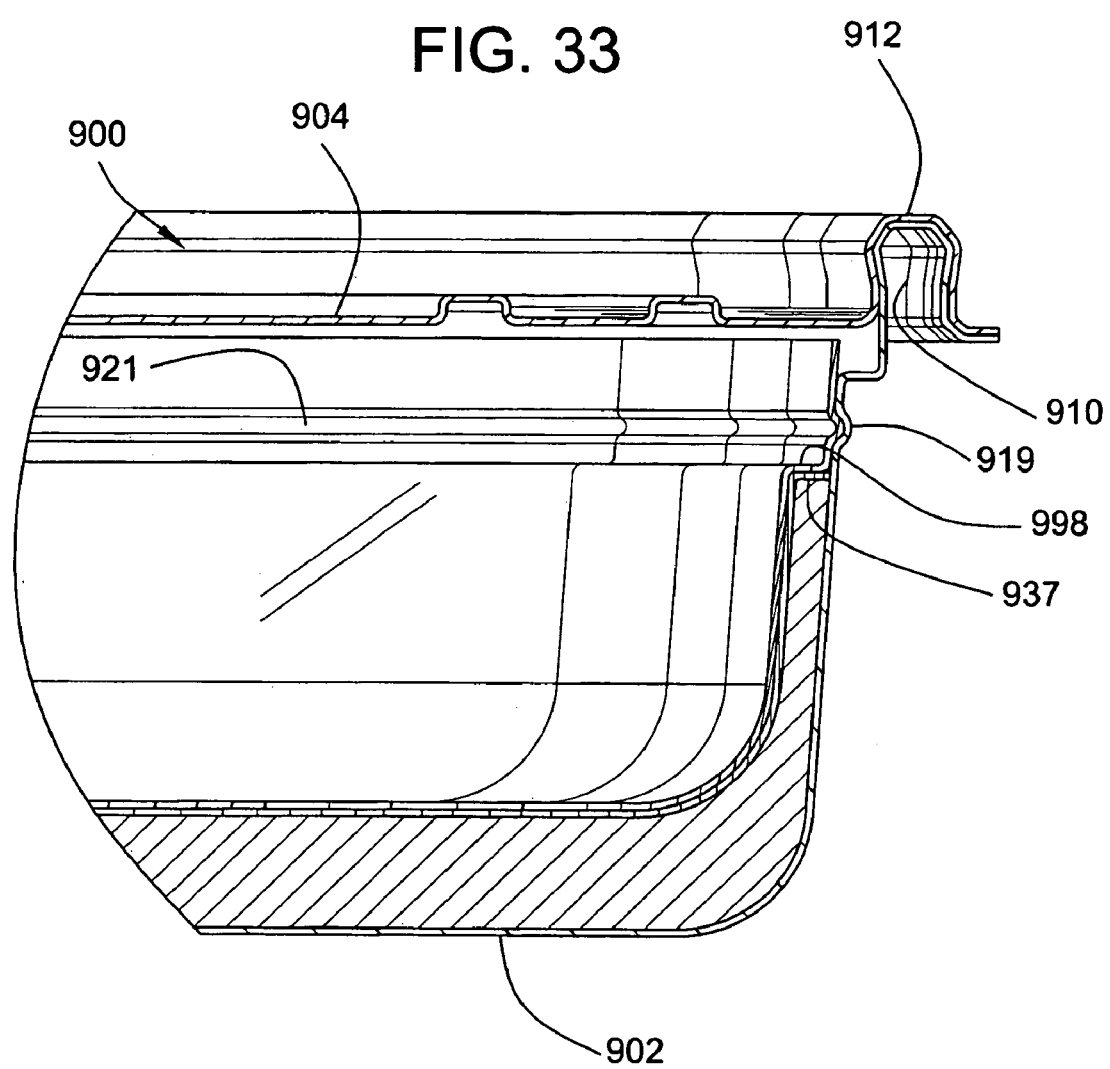
FIG. 33 is an enlarged, detail view of the area indicated in FIG. 32.

Referring to FIG. 33, the first closure portion 910 of the base 902 is sealingly engaged with the third closure portion 912 of the cover 904. A step 998 of the insert 903 rests upon the shoulder 937 of the base 1002. The rib 921 of the insert 903 is engaged with the detent groove 919 of the base 902 to mount the insert 903 thereto. The container 900 can be similar in other respects to the container 100 of FIG. 1.

Figure 34:
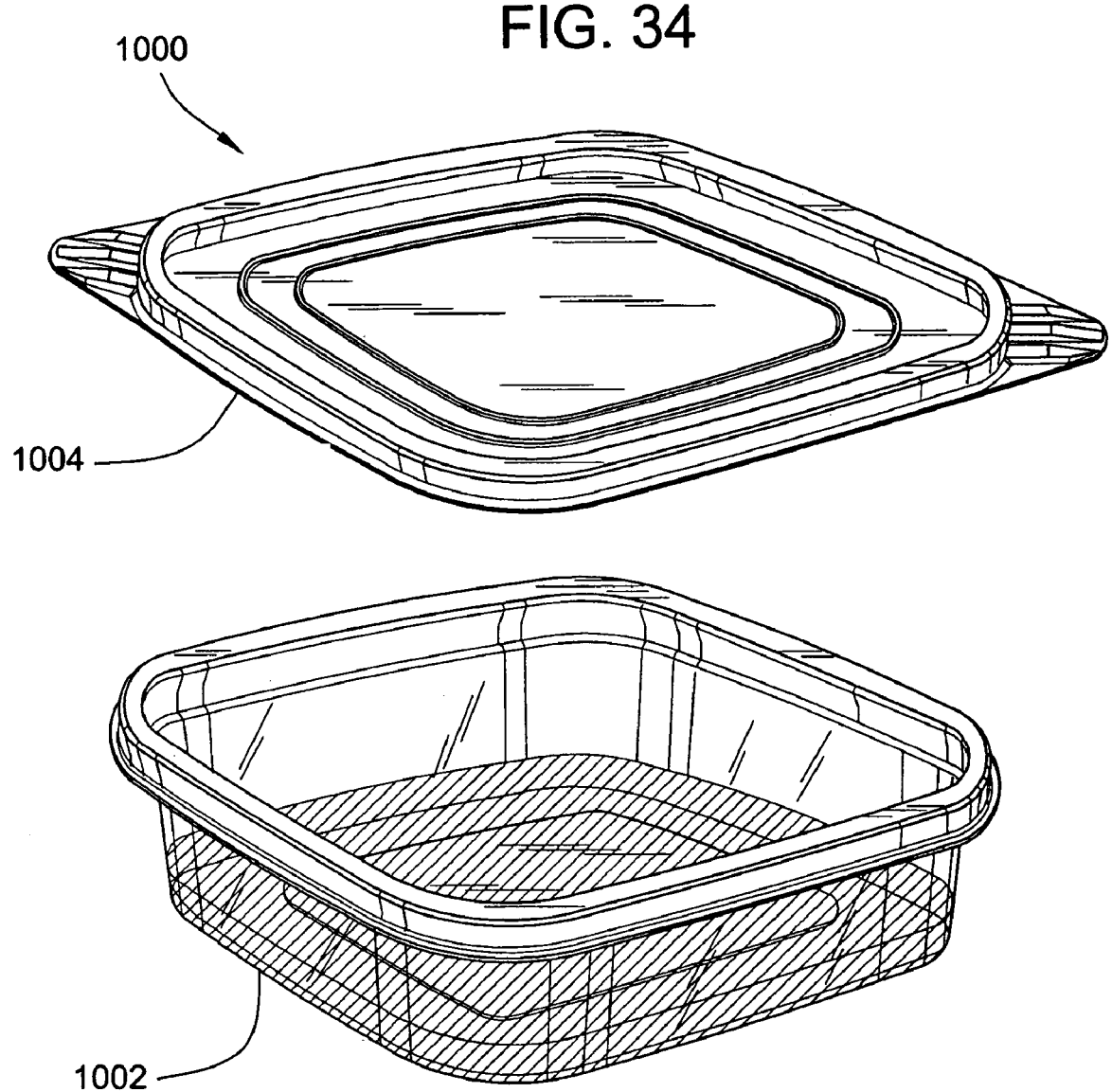
FIG. 34 is an exploded view of another embodiment of a container according to the present invention.

Referring to FIG. 34, another embodiment of a container 1000 according to the present invention is shown. The container 1000 includes a base 1002 and a cover 1004. The base 1002 and the cover 1004 are similar to the base 102 and the cover 104 of FIG. 1, respectively. The container 1000 does not include an insert. In other embodiments, an insert can be provided which may or may not be used such that the closure portion of the cover can sealingly engage to either the insert or the base.

Figure 35:
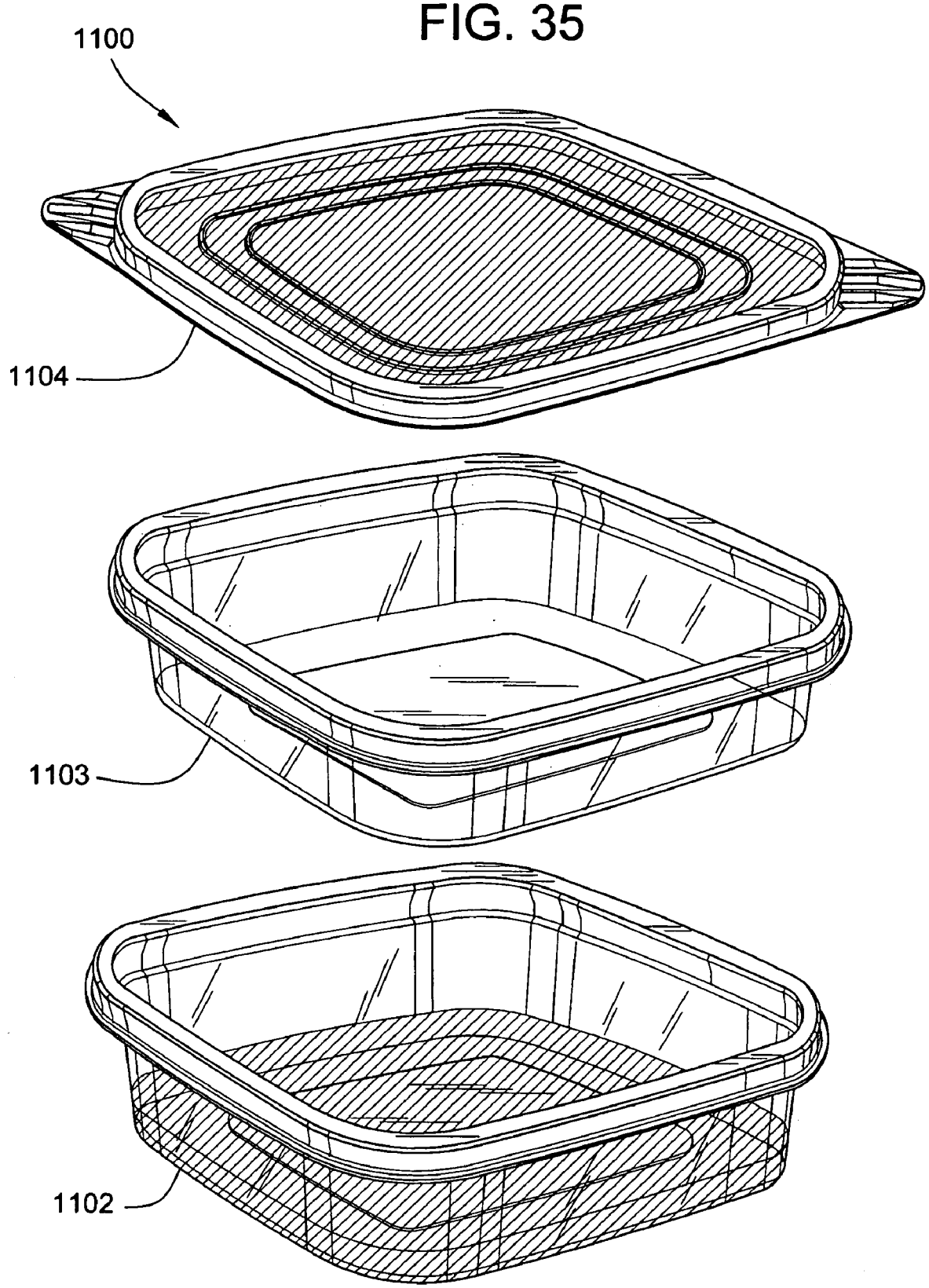
FIG. 35 is an exploded view of another embodiment of a container according to the present invention.
Figure 36:
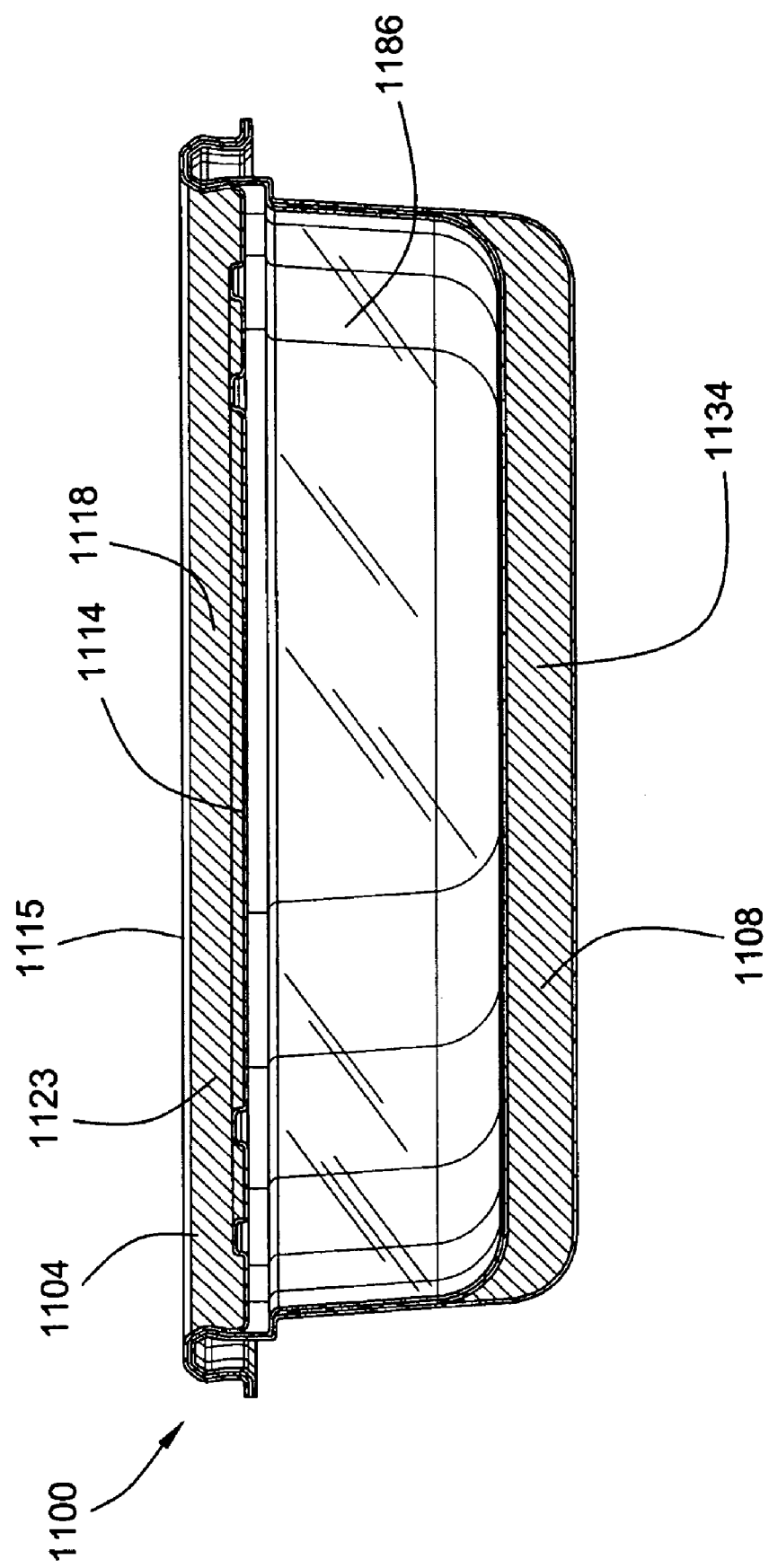
FIG. 36 is a sectional view of the container of FIG. 35.

Referring to FIGS. 35 and 36, another embodiment of a container 1100 according to the present invention is shown. The container 1100 includes a base 1102, an insert 1103, and a cover 1104. The base 1102 and the insert 1103 are substantially similar to the base 102 and the insert 103 of FIG. 1, respectively.

Referring to FIG. 36, the cover 1104 can have a double-walled construction such that a pair of wall partitions 1114, 1115 are in spaced relationship to each other to define a storage area 1118 therebetween. The double-walled construction can provide insulative characteristics such that the transfer of thermal energy between the food storage compartment 1186 defined by the cover 1104 and the insert 1103 and the exterior of the container 1100 by way of the cover 1104 is impeded. The area 1118 between the partitions 1114, 1115 of the cover 1104 can be empty or can be filled with a media 1123 that has insulative qualities such as foamed polypropylene, foamed polystyrene, or ribbed plastic, for example. In other embodiments, the storage area 1118 of the cover can house a thermal generator for providing a cooling effect, a heating effect, or both. In other embodiments, the base may house in its storage area 1134 an insulative media similar to that used in the cover 1104 in lieu of the thermal generator 1108, for example.

Figure 37:
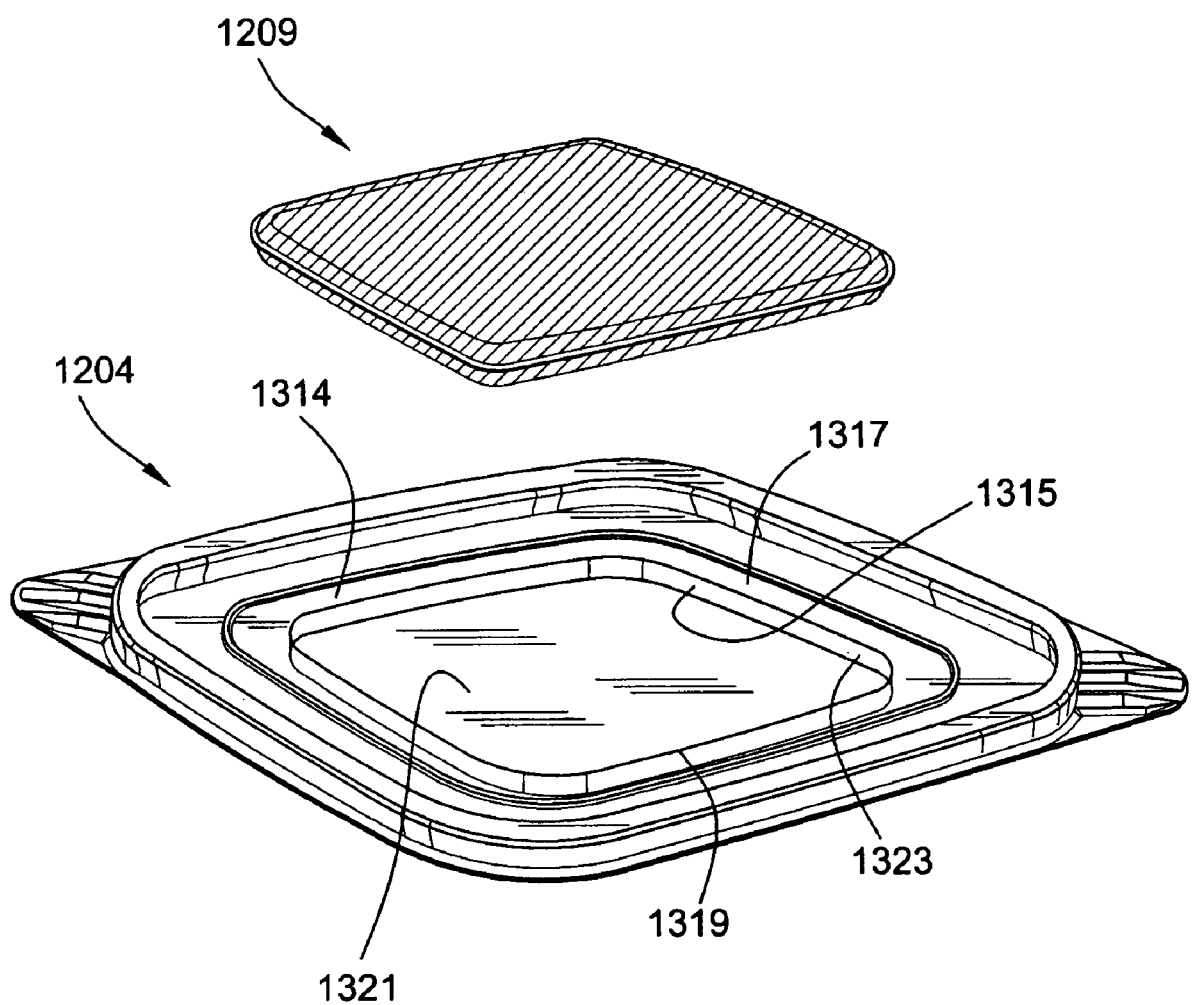
FIG. 37 is an exploded view of another embodiment of a cover and a media packet for use in a container according to the present invention.

Referring to FIG. 37, another embodiment of a cover 1204 is shown that is useful in connection with a container according to the present invention. The cover 1204 can be used with an insert and a base. The cover 1204 can include a removable thermal generator 1209 in the form of a media packet. The cover 1204 can include a field portion 1314 which defines a well 1315 for receiving the thermal packet 1209. In this embodiment, the well 1315 can be defined by an upper portion 1317 defining a well opening 1319, a recessed portion 1321 defining a well bottom, and an offset portion 1323 extending therebetween and defining the depth of the well 1315. The well 1315 can be similar to any of the wells discussed herein in connection with embodiments of a base for use with a container. For example, the offset portion 1321 can be tapered. The cover 1204 can be similar in other respects to the cover 104 of FIG. 1.

The base, the insert, and the cover can be fabricated by thermoforming a clarified polypropylene homopolymer material, such as the clarified polypropylene homopolymer with the trade name 3289 MZ and sold by Fina Oil and Chemical Co. In another embodiment, the container may be fabricated by thermoforming a clarified random copolymer polypropylene material, such as Pro-fax SR-256M from Montell North America Inc., Wilmington, Del. Alternative plastic materials which would be suitable for fabricating the container by thermoforming include PS (polystyrene), CPET (crystalline polyethylene terephthalate), APET (amorphous polyethylene terephtbalate), HDPE (high density polyethylene), PVC polyvinyl chloride), PC (polycarbonate), and foamed polypropylene, for example.

The base, the insert, and the cover can be made from a generally transparent material to allow a user to view the inside of the container to view its contents. The base, the insert, and/or the cover can be made from a material which has a color. For example, the lid may have a first color, the bottom a second color, and the insert a third color. The container can be constructed from a material that is suitable for use in conventional freezers and microwave ovens and that is dishwasher-safe.

The container may include only one notch for venting or may include a plurality of notches in spaced relationship to each other around the perimeter. The container from a top plan view may be circular, elliptic, or generally rectangular.

The container may include additional features. For example, the container top and/or the container bottom may have an area which allows the user to write information, such as, the date or the user's name. The write-on area could be an opaque color, such as, an opaque white, which would receive a contrasting color from a writing instrument, such as, a marker with black ink. The write-on area could be incorporated into the material for the container or could be applied to the material, such as, by printing.

The container may also include a visual indication of closure between the container top and the container insert and/or base. The visual indication may be a color change in the area where the container top engages the container bottom. In one embodiment, the closure device on the container top may be a first color, such as, a translucent blue and the closure device on the container bottom may be a second color, such as, an opaque yellow. When the closure devices are occluded, the first and second colors produce a third color, such as, a green which is visible to the user to indicate that the container is sealed. Alternatively, the color change can result from the appearance or loss of a color as a result of hindrance by the closure portions. Examples of color change closures and techniques for forming a color change seal are shown in U.S. Pat. Nos. 4,186,786, 4,285, 105, 4,829,641, 4,907,321, 5,248,201, 5,356,222, 5,252,281 and 5,427,266 which are incorporated herein by reference.

The colors may be incorporated into the material for the container or a portion of the container, such as in the closure area, or the colors may be applied to the material, such as, by printing. The actual inclusion of a color change closure or visual indication closure can be effected by use of established commercially available techniques. For example, if the lid and tub are to have a different color at the interface where the lid attaches to the tub the two respective surfaces can be fashioned with a color or design by use of screen printing (also known as silk-screen printing), pad printing (also known as transfer pad printing) or ink jet printing. The printing may be performed on the unformed material or the printing may be performed on the formed container. In addition, other approaches for forming a color or pattern on the lid and tub surfaces where such mate includes the use of co-extruded sheet material which is then thermoformed. The aforementioned techniques are well known for use in providing decorative surfaces to plastic surfaces.

Furthermore, the colors may be incorporated into the material by using in-mold labeling during the thermoforming process. The process for in-mold labeling for thermoforming involves the following steps. The label, such as an opaque yellow label, is positioned in a predetermined location on the thermoforming cavity for the part. The plastic is then positioned over the label and over the thermoforming cavity. The part is then formed and the label is embedded into the part. As an example, the closure device on the container top may include a translucent blue in-mold label and the closure device on the container bottom may be an opaque yellow in-mold label. When the closure devices are occluded, the in-mold labels produce green which is visible to the user to indicate that the container is sealed.

The container may also include an audible indication of closure or a tactile indication of closure. In one embodiment, the closure device on the container top includes interior protrusions which engage exterior detents on the closure device on the container bottom. When the closure devices are engaging, the closure devices will make a clicking sound and cause a vibration in the container which is perceptible to the user to indicate that the container is sealed. Examples of audible closures and/or tactile closures disclosing techniques to provide this functionality are shown in U.S. Pat. Nos. 4,944,072, 5,070,584, 5,138,750, 5,140,727, 5,154, 086, 5,363,540, 5,403,094 and published European applications EP A 90314084.5 and EP A 92301996.2 which are incorporated herein by reference.

The container may also include a rough exterior surface to reduce slipping and improve grasping by the user. For example, the exterior of the container bottom may have a textured surface, as opposed to a smooth surface, to improve handling by the user, especially if the user's hands are wet or greasy.

In addition, the container may include a self-venting feature. The pressure in the sealed container may increase when the sealed container and contents are heated in a microwave oven. Thus, the container top may include a self-venting mechanism which opens when the pressure in the container exceeds a predetermined value.

The container bottom may include a peelable lid with a super seal. Specifically, in a commercial use, the container bottom may include an interior peelable lid which is glued to the closure device.

In another embodiment, the peelable lid would release or vent when the sealed container and contents are heated in a microwave oven. Specifically, the heat would weaken the glue and allow the pressure to escape and/or the glue would be the weakest point of the container and allow the pressure to escape.

The container may be divided to separate various foods in the container. The divider would permit the user to store one food in one compartment and another food in another compartment. The divider may be integral with the container or a separate component. In addition, only the container bottom may include a divider or both the container bottom and the container top may each include a divider. The divider located in the container top may only partially engage the divider in the bottom of the container so as to provide splash protection or may fully engage the divider in the bottom of the container so as to provide varying degrees of intercompartmental leak resistance. The container may be compartmented by use of a separate smaller container that can be disposed within the main container such that the smaller container is securely maintained by a locating means or fastening means. The smaller container may be lidded or may utilize the container cover as a lid.

The container may also include a temperature-indicating strip which would indicate the temperature of the container and contents. In one embodiment, the temperature strip could indicate the approximate temperature of the container and contents. In another embodiment, the temperature strip could indicate whether the container and contents are within one of several temperature ranges. In a third embodiment, the temperature strip could indicate whether the container and contents are either hot or cold.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

While the invention is described herein in connection with certain preferred embodiments, there is no intent to limit the present invention to those embodiments. On the contrary, it is recognized that various changes and modifications to the described embodiments will be apparent to those skilled in the art upon reading the foregoing description, and that such changes and modifications may be made without departing from the spirit and scope of the present invention. The inventors expect skilled artisans to employ such variations as appropriate, and the inventors intend for the invention to be practiced otherwise than as specifically described herein. Accordingly, the intent is to cover all alternatives, modifications, and equivalents included within the spirit and scope of the invention. Moreover, any combination of the above-described elements in all possible variations thereof is encompassed by the invention unless otherwise indicated herein or otherwise clearly contradicted by context.

What is claimed is:

1. A container comprising:
    a base, the base including a bottom, a peripheral sidewall extending from the bottom, an open top, and a first closure portion;
    an insert, the insert configured such that it is disposable within the base, the insert including a second closure portion, the second closure portion being mechanically and re-sealingly engageable with the first closure portion when the insert is disposed within the base;
    a cover, the cover including a third closure portion, the third closure portion being sealingly engageable with the second closure portion of the insert so that when the second and third closure portions are engaged with each other, the cover and the insert define a substantially sealed storage area; and
    a thermal source, the thermal source disposed within the base such that when the insert is disposed in the base, the insert is in close proximity to the thermal source.

2. The container of claim 1, wherein the first, second, and third closure portions comprise locking rings.

3. The container of claim 1, wherein the base includes a partition in spaced relationship with the bottom, the partition extending to the sidewall to define an enclosed storage area, the partition and the sidewall defining an interior cavity for receiving the insert, and the thermal source disposed in the storage area.

4. The container of claim 3, wherein the insert includes a bottom and a sidewall, the bottom of the insert being adjacent the partition when the insert is disposed within the base.

5. The container of claim 1, wherein the cover includes a gripping tab.

6. The container of claim 1, wherein the thermal source provides thermal energy to act as a cooler.

7. The container of claim 1, wherein the thermal source provides thermal energy to act as a heater.

8. The container of claim 1, wherein the thermal source selectively provides thermal energy to act as either a cooler or a heater.

9. The container of claim 1, wherein the thermal source comprises a thermal media.

10. The container of claim 9, wherein the thermal media comprises a gel.

11. The container of claim 3, wherein the thermal source comprises a thermal media in the form of a gel, the storage area being substantially filled with the gel.

12. The container of claim 9, wherein the thermal media bears an indicia to indicate information about the thermal source.

13. The container of claim 12, wherein the indicia is the color blue to indicate the thermal source acts as a cooler.

14. The container of claim 12, wherein the indicia is the color red to indicate the thermal source acts as a heater.

15. The container of claim 1, wherein the thermal source comprises a packet which includes a thermal media housed in a flexible pouch.

16. The container of claim 15, wherein the packet is attached to the bottom of the base.

17. The container of claim 1, wherein the base includes a well for receiving the thermal source, the thermal source being removably disposable within the well.

18. The container of claim 17, wherein the well comprises a channel that defines a groove configured to receive the thermal source.

19. The container of claim 15, wherein the base includes a well for receiving the packet, the packet being removably disposable within the well.

20. The container of claim 19, wherein the bottom of the base defines the well.

21. The container of claim 19, wherein the sidewall of the base defines the well.

22. The container of claim 20, wherein the bottom includes a support portion defining a well opening, a recessed portion disposed in spaced relationship to the support portion and defining a well bottom, and an offset portion extending between the support portion and the recessed portion and defining a well sidewall, the well sized such that when the packet is disposed therein, a first face of the packet is positionable to overlie the well bottom and a second face of the packet is positionable to be in substantial alignment with the support portion.

23. The container of claim 22, wherein the offset portion of the well is tapered.

24. The container of claim 23, wherein the well opening is smaller than the wall bottom such that the offset portion tapers outwardly from the well opening to the well bottom.

25. The container of claim 1, wherein the thermal source comprises a plurality of packets which each includes a thermal media housed in a flexible pouch.

26. The container of claim 25, wherein one of the packets is attached to the bottom of the base.

27. The container of claim 26, wherein another of the packets is attached to the sidewall of the base.

28. The container of claim 26, wherein the remainder of the packets is attached to the sidewall of the base.

29. The container of claim 27, wherein the sidewall includes a well in the form of a channel for receiving the packet attached to the sidewall of the base, the packet being removably disposable within the channel.

30. The container of claim 1, wherein the first and third closure portions comprise locking rings, and the second closure portion comprises a seal rim.

31. The container of claim 30, wherein the first and third closure portions are engageable with each other.

32. The container of claim 1, wherein the cover has a pair of partitions in spaced relationship to each other, the partitions defining a storage area therebetween.

33. The container of claim 32, wherein the storage area contains an insulative media.

34. The container of claim 1, wherein the cover includes a well for receiving a second thermal source, the second thermal source being removably disposable within the well.

35. A container comprising:
a base, the base including a bottom, a peripheral sidewall extending from the bottom, an open top, a first closure portion, and a detent groove extending around the sidewall;
an insert, the insert configured such that it is disposable within the base, the insert including a bottom and a sidewall, the insert including a rib extending around the sidewall, the rib being engageable with the detent groove of the base when the insert is disposed within the base;
a cover, the cover including a second closure portion, the second closure portion being engageable with the first closure portion of the base;
a thermal source, the thermal source disposed within the base such that when the insert is disposed in the base, the insert is in close proximity to the thermal source;
wherein the base includes a partition, the partition extending to the sidewall and cooperating with the sidewall and the bottom to define an enclosed storage area, the partition including a bottom panel, a sidewall panel, and a shoulder portion, the partition and the sidewall defining an interior cavity for receiving the insert, and the thermal source disposed in the storage area; and
wherein the insert includes a step, the shoulder portion of the base in contacting relationship with the step of the insert when the insert is disposed within the base and the rib of the insert is engaged with the groove of the base.

36. A container comprising:
a base, the base including a bottom, a peripheral sidewall extending from the bottom, an open top, and a first closure portion;
a cover, the cover including a second closure portion, the second closure portion being sealingly engageable with the first closure portion of the base so that when the first and second closure portions are engaged with each other, the cover and the base define a substantially sealed storage area;
a thermal source; and
wherein the base includes a partition in spaced relationship with the bottom, the partition extending to the sidewall and defining an enclosed storage area for the thermal source, the partition and the sidewall defining an interior cavity, and the thermal source disposed in the enclosed storage area.

37. A container comprising:
a base, the base including a bottom, a peripheral sidewall extending from the bottom, an open top, and a first closure portion;
a cover, the cover including a second closure portion, the second closure portion being sealingly engageable with the first closure portion of the base so that when the first and second closure portions are engaged with each other, the cover and the base define a substantially sealed storage area;
a thermal source,
wherein the cover has a pair of partitions in spaced relationship to each other; and the partitions defining an enclosed storage area therebetween for the thermal source, the thermal source disposed in the enclosed storage area.

* * * * *